(12) United States Patent
Noguchi et al.

(10) Patent No.: US 10,635,234 B2
(45) Date of Patent: Apr. 28, 2020

(54) DISPLAY DEVICE

(71) Applicant: Japan Display Inc., Tokyo (JP)

(72) Inventors: Koji Noguchi, Tokyo (JP); Takayuki Nakanishi, Tokyo (JP)

(73) Assignee: Japan Display Inc., Tokyo (JP)

(*) Notice: Subject to any disclaimer, the term of this patent is extended or adjusted under 35 U.S.C. 154(b) by 73 days.

(21) Appl. No.: 15/953,894

(22) Filed: Apr. 16, 2018

(65) Prior Publication Data

US 2018/0307367 A1 Oct. 25, 2018

(30) Foreign Application Priority Data

Apr. 19, 2017 (JP) ................... 2017-082937

(51) Int. Cl.
*G06F 3/041* (2006.01)
*G06F 3/044* (2006.01)

(52) U.S. Cl.
CPC ........ *G06F 3/041662* (2019.05); *G06F 3/044* (2013.01); *G06F 3/0416* (2013.01); *G06F 2203/04101* (2013.01); *G06F 2203/04107* (2013.01); *G06F 2203/04112* (2013.01)

(58) Field of Classification Search
CPC .. G06F 3/041662; G06F 3/0416; G06F 3/044; G06F 2203/04101; G06F 2203/04107; G06F 2203/04112
See application file for complete search history.

(56) References Cited

U.S. PATENT DOCUMENTS

| 2010/0182273 | A1 | 7/2010 | Noguchi et al. |
| 2015/0220204 | A1 | 8/2015 | Noguchi et al. |
| 2015/0317008 | A1* | 11/2015 | Chandran ............... G06F 3/044 345/174 |

FOREIGN PATENT DOCUMENTS

JP 2009-244958 A 10/2009

* cited by examiner

*Primary Examiner* — Jonathan A Boyd
(74) *Attorney, Agent, or Firm* — K&L Gates LLP

(57) ABSTRACT

A display device includes a first substrate, a second substrate, a first electrode, a second electrode, a drive circuit, and a control circuit. The second substrate faces the first substrate. The first electrode is provided in a display region of the first substrate. The second electrode is provided to the second substrate at a position closer to a display surface than the first electrode in a direction perpendicular to the first substrate. The drive circuit supplies a first drive signal or a second drive signal to the second electrode. The control circuit has a first detection mode and a second detection mode.

20 Claims, 27 Drawing Sheets

DISPLAY DEVICE

CROSS-REFERENCE TO RELATED APPLICATIONS

This application claims priority from Japanese Application No. 2017-082937, filed on Apr. 19, 2017, the contents of which are incorporated by reference herein in its entirety.

BACKGROUND

1. Technical Field

The present disclosure relates to a display device.

2. Description of the Related Art

Touch detection devices capable of detecting an external proximity object, what are called touch panels, have recently been attracting attention. Touch panels are mounted on or integrated with a display device, such as a liquid crystal display device, and used as display devices with a touch detection function (refer to Japanese Patent Application Laid-open Publication No. 2009-244958 A). Various functions of the display devices are known, including a touch detection function to detect contact of a finger of an operator with a screen and a hover detection (proximity detection) function to detect a proximity state, a gesture, or the like of the finger not in contact with the screen.

Touch detection and hover detection are significantly different in the distance between detection electrodes and an object to be detected serving as a detection target, such as a finger, and in the resolution required for the detection. If electrodes and a drive configuration for touch detection are used for hover detection without any change, it may possibly be difficult to perform hover detection satisfactorily. Increasing the area of detection electrodes is an effective way to increase the detection sensitivity in hover detection. In this case, however, the detection sensitivity in touch detection may possibly decrease.

SUMMARY

A display device according to one aspect includes a first substrate, a second substrate facing the first substrate, a first electrode provided in a display region of the first substrate, a second electrode provided to the second substrate at a position closer to a display surface than the first electrode in a direction perpendicular to the first substrate, a drive circuit configured to supply a first drive signal or a second drive signal to the second electrode, and a control circuit having a first detection mode for detecting an object to be detected in contact with the display surface based on a first detection signal corresponding to a change in mutual capacitance between the first electrode and the second electrode when the first drive signal is supplied to the second electrode, and a second detection mode for detecting the object to be detected not in contact with the display surface based on a second detection signal corresponding to a change in self-capacitance in the second electrode when the second drive signal is supplied to the second electrode. The first electrode and the second electrode do not overlap in planar view.

DETAILED DESCRIPTION

Figure 1:
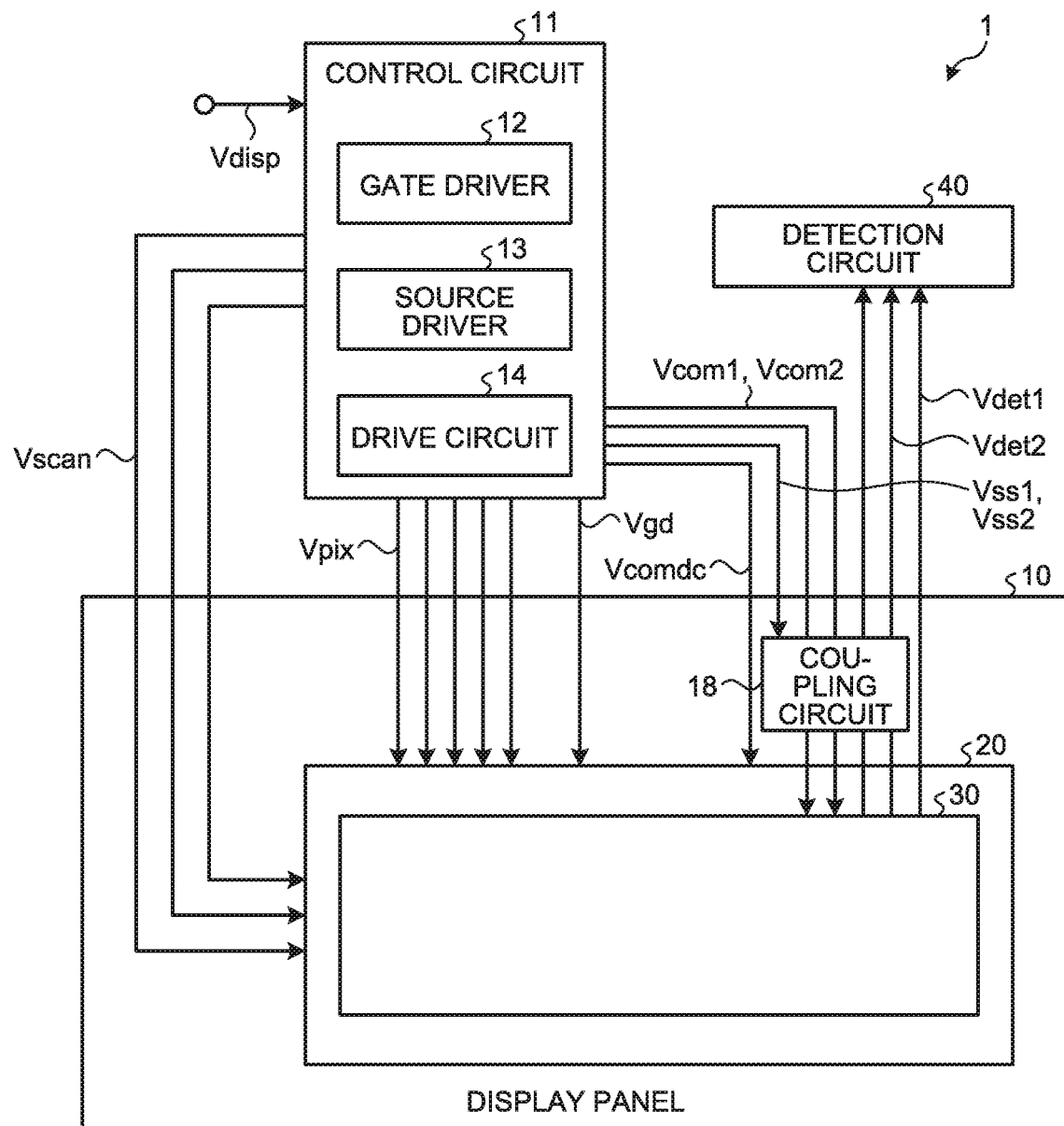
FIG. 1 is a block diagram of an exemplary configuration of a display device according to an embodiment of the present disclosure.

Exemplary aspects (embodiments) to embody the present disclosure are described below in greater detail with reference to the accompanying drawings. The contents described in the embodiments are not intended to limit the present disclosure. Components described below include components easily conceivable by those skilled in the art and components substantially identical therewith. Furthermore, the components described below may be appropriately combined. What is disclosed herein is given by way of example only, and appropriate changes made without departing from the spirit of the present disclosure and easily conceivable by those skilled in the art naturally fall within the scope of the disclosure. To simplify the explanation, the drawings may possibly illustrate the width, the thickness, the shape, and other elements of each unit more schematically than the actual aspect. These elements, however, are given by way of example only and are not intended to limit interpretation of the present disclosure. In the present specification and the figures, components similar to those previously described with reference to previous figures are denoted by like reference numerals, and detailed explanation thereof may be appropriately omitted.

Embodiments

Figure 2:
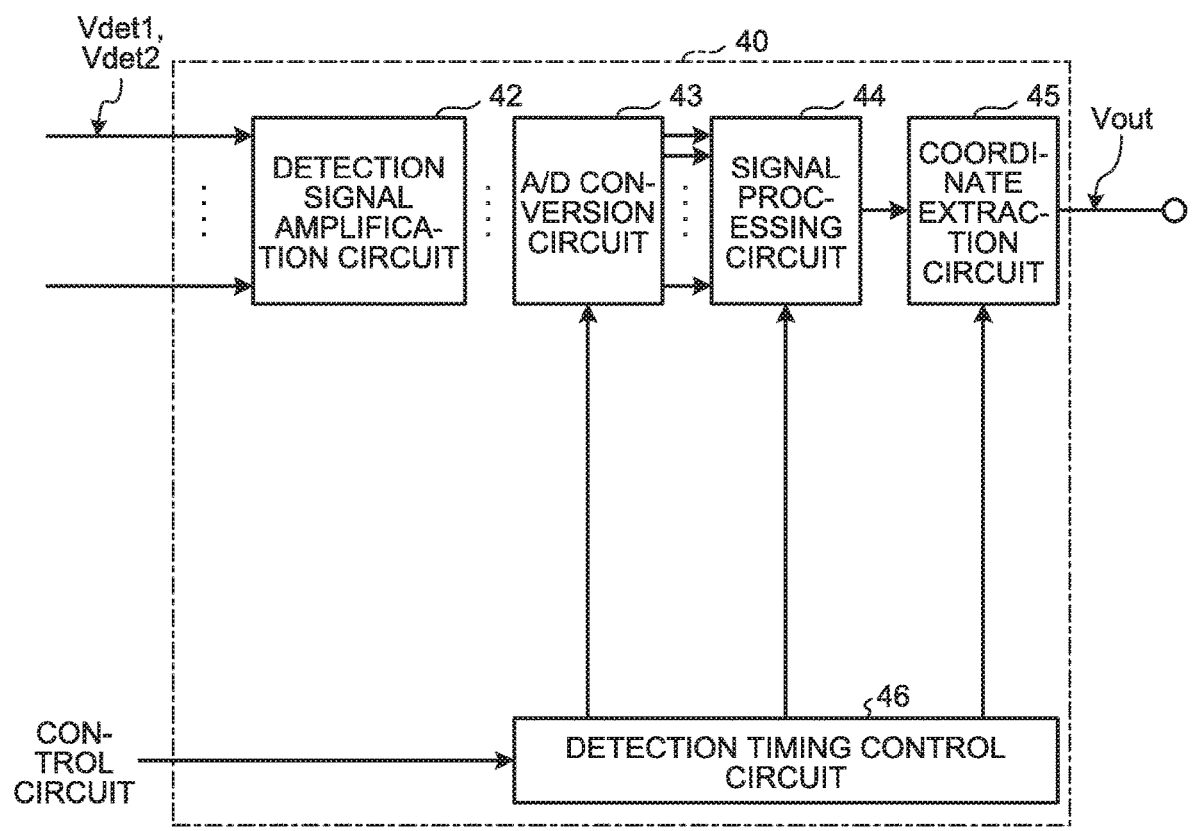
FIG. 2 is a block diagram of an exemplary configuration of a detection circuit.

FIG. 1 is a block diagram of an exemplary configuration of a display device according to an embodiment of the present disclosure. FIG. 2 is a block diagram of an exemplary configuration of a detection circuit. As illustrated in FIG. 1, a display device 1 includes a display panel 10, a control circuit 11, and a detection circuit 40. The display panel 10 includes a display region 20 and a touch sensor 30. The display region 20 displays an image. The touch sensor 30 is a detection device that detects touch input.

The display panel 10 is a display device in which the display region 20 and the touch sensor 30 are integrated. Specifically, in the display panel 10, part of members, such as electrodes and substrates, of the display region 20 are also used as electrodes and substrates of the touch sensor 30.

The display region 20 includes liquid crystal display elements serving as display elements. The display region 20 includes a plurality of pixels having the display elements and has a display surface facing the pixels. The display region 20 receives video signals to display an image composed of the pixels on the display surface. The display region 20 may be an organic electroluminescence (EL) display panel, for example.

The display panel 10 further includes a coupling circuit 18. The coupling circuit 18 is provided between the touch sensor 30 and the detection circuit 40. The coupling circuit 18 switches between coupling and cutting off of second electrodes TDL to be a target of detection drive to and from the detection circuit 40 based on switch control signals Vss1 and Vss2 supplied from the control circuit 11.

The control circuit 11 includes a gate driver 12, a source driver 13, and a drive circuit 14. The control circuit 11 supplies control signals to the gate driver 12, the source driver 13, the drive circuit 14, the coupling circuit 18, and the detection circuit 40 based on video signals Vdisp supplied from the outside, thereby controlling a display operation and a detection operation.

The gate driver 12 supplies scanning signals Vscan to one horizontal line to be a target of display drive in the display panel 10 based on the control signals supplied from the control circuit 11. As a result, one horizontal line to be a target of display drive is sequentially or simultaneously selected.

The source driver 13 is a circuit that supplies pixel signals Vpix to respective sub-pixels SPix (refer to FIG. 14) of the display region 20. Part of the functions of the source driver 13 may be provided to the display panel 10. In this case, the control circuit 11 may generate the pixel signals Vpix and supply them to the source driver 13.

The drive circuit 14 supplies display drive signals Vcomdc to third electrodes COML of the display panel 10. The drive circuit 14 supplies first drive signals Vcom1 or second drive signals Vcom2 for detection to the second electrodes TDL of the display panel 10 via the coupling circuit 18. The drive circuit 14 supplies guard signals Vgd to the third electrodes COML in touch detection and hover detection.

The control circuit 11 according to the present embodiment performs, in a time-division manner, a display mode of causing the display region 20 to perform display and a detection mode of causing the touch sensor 30 to detect an object to be detected. The control circuit 11 has two detection modes, that is, touch detection (first detection mode) and hover detection (second detection mode) as the detection mode performed by the touch sensor 30. In the present specification, touch detection is to detect the position of an object to be detected in a state where the object to be detected is in contact with the display surface or in proximity to the display surface close enough to consider it in contact therewith (hereinafter, referred to as a "contact state"). Hover detection is to detect the position and a movement of an object to be detected in a state where the object to be detected is neither in contact with the display surface nor in proximity to the display surface close enough to consider it in contact therewith (hereinafter, referred to as a "non-contact state"). A state where no object to be detected is present at a position facing the display surface or a state where an object to be detected is too far away from the display surface to be detected in hover detection is referred to as a "non-present state".

The touch sensor 30 performs touch detection based on the basic principle of touch detection by a mutual capacitance method (also referred to as a mutual method). If the touch sensor 30 detects an object to be detected in the contact state, the touch sensor 30 outputs first detection signals Vdet1 to the detection circuit 40. The touch sensor 30 performs hover detection based on the basic principle of touch detection by a self-capacitance method (also referred to as a self-method). If the touch sensor 30 detects an object to be detected in the non-contact state, the touch sensor 30 outputs second detection signals Vdet2 to the detection circuit 40 via the coupling circuit 18.

In mutual capacitance touch detection, the detection circuit 40 determines whether a touch is made by an object to be detected on the display surface of the display panel 10 based on the control signals supplied from the control circuit 11 and on the first detection signals Vdet1 output from the display panel 10. If a touch is detected, the detection circuit 40 calculates the coordinates at which the touch input is made, for example. In self-capacitance hover detection, the detection circuit 40 can detect the position and a movement, such as a gesture, of an object to be detected in the non-contact state based on the control signals supplied from the control circuit 11 and on the second detection signals Vdet2 output from the display panel 10.

As illustrated in FIG. 2, the detection circuit 40 includes a detection signal amplification circuit 42, an analog/digital (A/D) conversion circuit 43, a signal processing circuit 44, a coordinate extraction circuit 45, and a detection timing control circuit 46. The detection timing control circuit 46 controls the A/D conversion circuit 43, the signal processing circuit 44, and the coordinate extraction circuit 45 such that they operate synchronously with one another based on the control signals supplied from the control circuit 11.

In touch detection, the detection signal amplification circuit 42 amplifies the first detection signals Vdet1 supplied from the display panel 10. The A/D conversion circuit 43 samples analog signals output from the detection signal amplification circuit 42 at a timing synchronized with the first drive signals Vcom1, thereby converting the analog signals into digital signals.

The signal processing circuit 44 is a logic circuit that determines whether a touch is made on the display panel 10 based on the output signals from the A/D conversion circuit 43. The signal processing circuit 44 performs processing of extracting a signal (absolute value |ΔV|) of the difference between the detection signals caused by a finger. The signal processing circuit 44 compares the absolute value |ΔV| with a predetermined threshold voltage. If the absolute value |ΔV| is lower than the threshold voltage, the signal processing circuit 44 determines that an object to be detected is in the non-present state. By contrast, if the absolute value |ΔV| is equal to or higher than the threshold voltage, the signal processing circuit 44 determines that an object to be detected is in the contact state or a proximity state (non-contact state). The detection circuit 40 thus can perform touch detection.

The coordinate extraction circuit 45 is a logic circuit that calculates, if the signal processing circuit 44 detects a touch, the touch panel coordinates of the touch. The coordinate extraction circuit 45 outputs the touch panel coordinates as output signals Vout. The coordinate extraction circuit 45 may output the output signals Vout to the control circuit 11. The control circuit 11 can perform a predetermined display operation or detection operation based on the output signals Vout.

In hover detection, the detection circuit 40 performs the same processing as that described above based on the second detection signals Vdet2 supplied from the display panel 10. If the signal processing circuit 44 detects an object to be detected in the non-contact state, the coordinate extraction circuit 45 calculates the coordinates of the object to be detected. The detection circuit 40 thus can detect the position and a movement, such as a gesture, of the object to be detected in the non-contact state.

The detection signal amplification circuit 42, the A/D conversion circuit 43, the signal processing circuit 44, the coordinate extraction circuit 45, and the detection timing control circuit 46 of the detection circuit 40 are provided to the display device 1. The configuration is not limited thereto, and all or part of the functions of the detection circuit 40 may be provided to an external processor, for example. The coordinate extraction circuit 45, for example, may be provided to an external processor different from the display device 1. In this case, the detection circuit 40 may output the signals processed by the signal processing circuit 44 as the output signals Vout.

Figure 3:
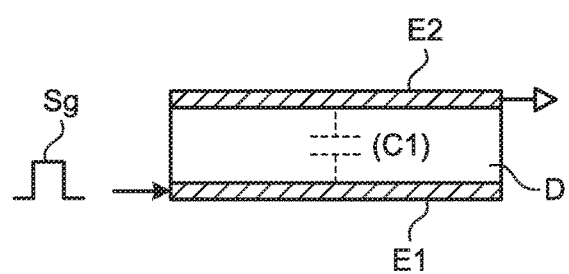
FIG. 3 is a diagram for explaining the basic principle of mutual capacitance touch detection and illustrates a non-present state.
Figure 4:
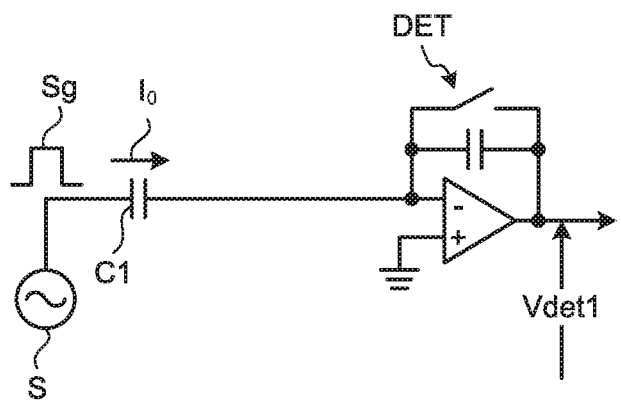
FIG. 4 is a diagram for explaining an example of an equivalent circuit in mutual capacitance touch detection in the non-present state.
Figure 5:
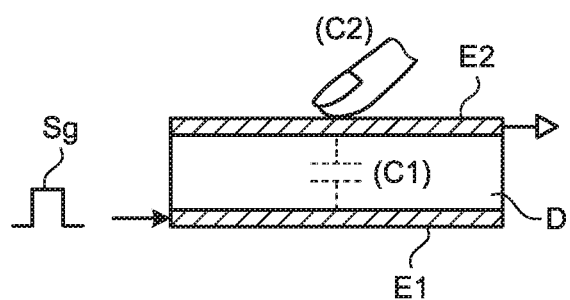
FIG. 5 is a diagram for explaining the basic principle of mutual capacitance touch detection and illustrates a contact state.
Figure 6:
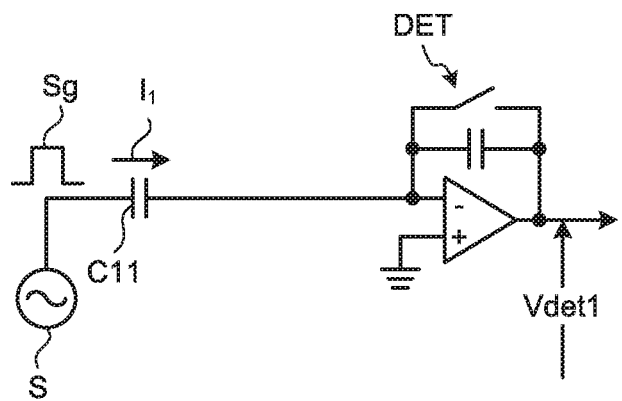
FIG. 6 is a diagram for explaining an example of the equivalent circuit in mutual capacitance touch detection in the contact state.
Figure 7:
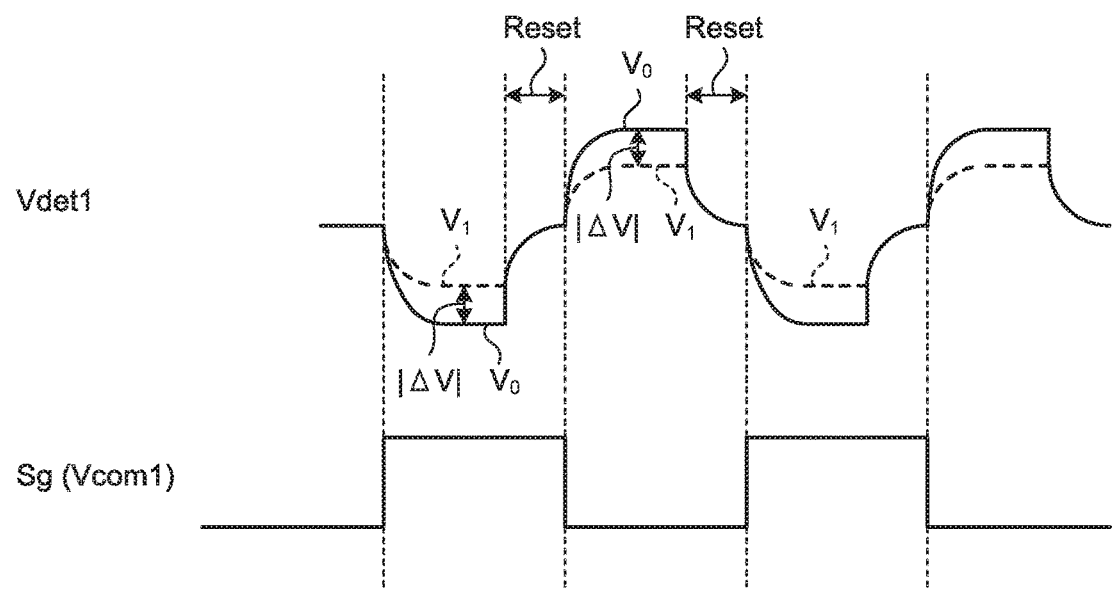
FIG. 7 is a diagram of an example of waveforms of a drive signal and a detection signal in mutual capacitance touch detection.

The display panel 10 performs touch control based on the basic principle of capacitance touch detection. The following describes the basic principle of mutual capacitance touch detection performed by the display device 1 according to the present embodiment with reference to FIGS. 3 to 7. FIG. 3 is a diagram for explaining the basic principle of mutual capacitance touch detection and illustrates the non-present state. FIG. 4 is a diagram for explaining an example of an equivalent circuit in mutual capacitance touch detection in the non-present state. FIG. 5 is a diagram for explaining the basic principle of mutual capacitance touch detection and illustrates the contact state. FIG. 6 is a diagram for explaining an example of the equivalent circuit in mutual capacitance touch detection in the contact state. FIG. 7 is a diagram of an example of waveforms of a drive signal and a detection signal in mutual capacitance touch detection. While the following describes a case where a finger is in contact with or in proximity to a detection electrode, the object to be detected is not limited to a finger and may be an object including a conductor, such as a stylus.

As illustrated in FIG. 3, a capacitance element C1 includes a pair of electrodes, that is, a drive electrode E1 and a detection electrode E2 facing each other with a dielectric D interposed therebetween. The capacitance element C1 generates fringe lines of electric force extending from the ends of the drive electrode E1 to the upper surface of the detection electrode E2 besides lines of electric force (not illustrated) generated between the facing surfaces of the drive electrode E1 and the detection electrode E2. As illustrated in FIG. 4, a first end of the capacitance element C1 is coupled to an alternating-current (AC) signal source (drive signal source) S, and a second end thereof is coupled to a voltage detector DET. The voltage detector DET is an integration circuit included in the detection signal amplification circuit 42 illustrated in FIG. 2, for example.

When the AC signal source S applies an AC rectangular wave Sg at a predetermined frequency (e.g., a frequency of the order of several kilohertz to several hundred kilohertz) to the drive electrode E1 (first end of the capacitance element C1), an output waveform (first detection signal Vdet1) illustrated in FIG. 7 appears via the voltage detector DET. The AC rectangular wave Sg corresponds to the first drive signal Vcom1 received from the drive circuit 14.

As illustrated in FIGS. 3 and 4, in the non-present state, an electric current $I_0$ depending on the capacitance value of the capacitance element C1 flows. The voltage detector DET illustrated in FIG. 4 converts fluctuations in the electric current depending on the AC rectangular wave Sg into fluctuations in the voltage (waveform $V_0$ indicated by the solid line (refer to FIG. 7)).

As illustrated in FIGS. 5 and 6, in the contact state, capacitance C2 generated by a finger is in contact with the detection electrode E2 or in proximity to the detection electrode E2 close enough to consider it in contact therewith. The fringe lines of electric force between the drive electrode E1 and the detection electrode E2 are blocked by a conductor (finger). As a result, the capacitance element C1 acts as a capacitance element C11 having a capacitance value smaller than that in the non-present state. As illustrated in FIGS. 5 and 6, the voltage detector DET converts fluctuations in an electric current $I_1$ depending on the AC rectangular wave Sg into fluctuations in the voltage (waveform $V_1$ indicated by the dotted line).

In this case, the waveform $V_1$ has amplitude smaller than that of the waveform $V_0$. Consequently, the absolute value |ΔV| of the voltage difference between the waveform $V_0$ and the waveform $V_1$ varies depending on an effect of an external object, such as a finger, in contact with or in proximity to the detection electrode from the outside. The voltage detector DET resets charge and discharge of a capacitor based on the frequency of the AC rectangular wave Sg by switching in the circuit. With the period Reset, the voltage detector DET can accurately detect the absolute value |ΔV| of the voltage difference.

As described above, the detection circuit 40 compares the absolute value |ΔV| with the predetermined threshold voltage, thereby determining whether the external proximity object is in the non-present state or in the contact or proximity state. The detection circuit 40 thus can perform touch detection based on the basic principle of mutual capacitance touch detection.

Figure 8:
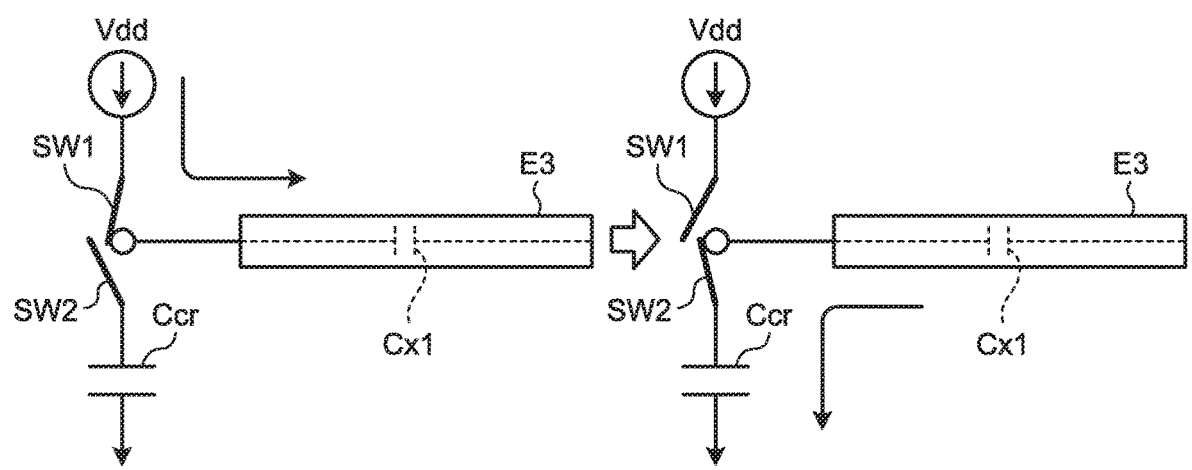
FIG. 8 is a diagram for explaining the basic principle of self-capacitance touch detection and illustrates a non-present state.
Figure 9:
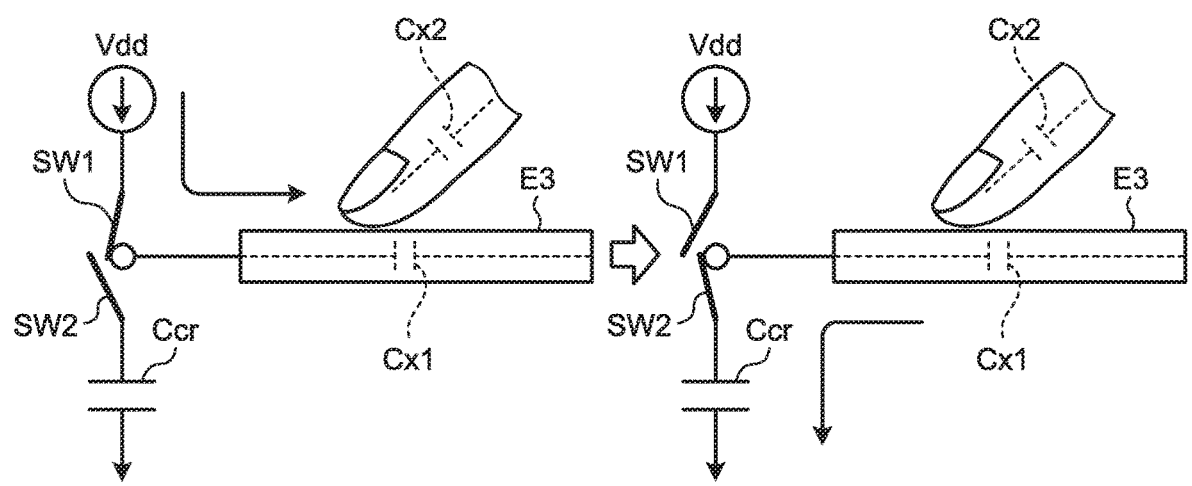
FIG. 9 is a diagram for explaining the basic principle of self-capacitance touch detection and illustrates a contact state.
Figure 10:
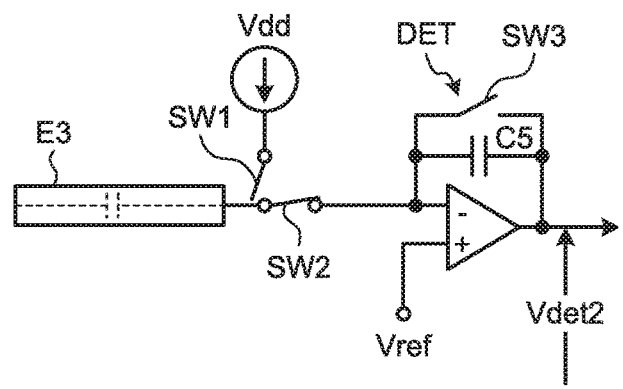
FIG. 10 is a diagram for explaining an example of an equivalent circuit in self-capacitance touch detection.
Figure 11:
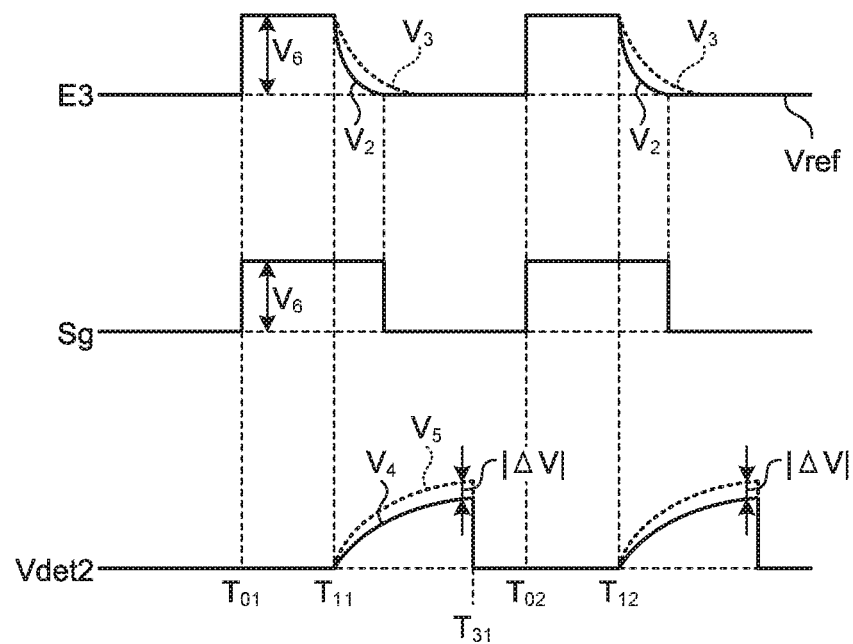
FIG. 11 is a diagram of an example of waveforms of a drive signal and a detection signal in self-capacitance touch detection.

The following describes the basic principle of self-capacitance touch detection with reference to FIGS. 8 to 11. FIG. 8 is a diagram for explaining the basic principle of self-capacitance touch detection and illustrating a non-present state. FIG. 9 is a diagram for explaining the basic principle of self-capacitance touch detection and illustrating a contact state. FIG. 10 is a diagram for explaining an example of an equivalent circuit in self-capacitance touch detection. FIG. 11 is a diagram of an example of waveforms of a drive signal and a detection signal in self-capacitance touch detection.

The left figure in FIG. 8 illustrates a state where a detection electrode E3 is coupled to a power source Vdd by a switch SW1 but is not coupled to a capacitor Ccr by a switch SW2 in the non-present state. In this state, capacitance Cx1 in the detection electrode E3 is charged. The right figure in FIG. 8 illustrates a state where coupling between the power source Vdd and the detection electrode E3 is cut off by the switch SW1, and the detection electrode E3 is coupled to the capacitor Ccr by the switch SW2. In this state, an electric charge in the capacitance Cx1 is discharged via the capacitor Ccr.

The left figure in FIG. 9 illustrates a state where the detection electrode E3 is coupled to the power source Vdd by the switch SW1 but is not coupled to the capacitor Ccr by the switch SW2 in the contact state. In this state, capacitance Cx2 generated by the finger in proximity to the detection electrode E3 is also charged besides the capacitance Cx1 in the detection electrode E3. The right figure in FIG. 9 illustrates a state where coupling between the power source Vdd and the detection electrode E3 is cut off by the switch SW1, and the detection electrode E3 is coupled to the capacitor Ccr by the switch SW2. In this state, an electric charge in the capacitance Cx1 and an electric charge in the capacitance Cx2 are discharged via the capacitor Ccr.

Because of the presence of the capacitance Cx2, the voltage change characteristics of the capacitor Ccr in discharging (contact state) illustrated in the right figure in FIG. 9 are clearly different from those of the capacitor Ccr in discharging (non-present state) illustrated in the right figure in FIG. 8. Consequently, the self-capacitance method determines whether an input operation is performed by a finger or the like using the fact that the voltage change characteristics of the capacitor Ccr vary depending on the presence of the capacitance Cx2.

Specifically, an AC rectangular wave Sg (refer to FIG. 11) at a predetermined frequency (e.g., several kilohertz to several hundred kilohertz) is applied to the detection electrode E3. The voltage detector DET illustrated in FIG. 10 converts fluctuations in the electric current depending on the AC rectangular wave Sg into fluctuations in the voltage (waveforms $V_4$ and $V_5$).

In FIG. 11, the voltage level of the AC rectangular wave Sg rises by an amount corresponding to voltage $V_6$ at time $T_{01}$. At this time, the switch SW1 is turned on, and the switch SW2 is turned off. As a result, the electric potential of the detection electrode E3 also rises to voltage $V_6$. Subsequently, the switch SW1 is turned off before time $T_{11}$. While the detection electrode E3 is in a floating state at this time, the electric potential of the detection electrode E3 is maintained at $V_6$ by the capacitance Cx1 (or Cx1+Cx2, refer to FIG. 9) of the detection electrode E3. Subsequently, the voltage detector DET performs a reset operation before time $T_{11}$.

Subsequently, when the switch SW2 is turned on at time $T_{11}$, the electric charge accumulated in the capacitance Cx1 (or Cx1+Cx2) of the detection electrode E3 moves to capacitance C5 in the voltage detector DET. As a result, output from the voltage detector DET increases (refer to the second detection signal Vdet2 in FIG. 11). In the non-present state, the output (the second detection signal Vdet2) from the voltage detector DET corresponds to the waveform $V_4$ indicated by the solid line, and Vdet2=Cx1×$V_6$/C5 is satisfied. In the contact state, the output corresponds to the waveform $V_5$ indicated by the dotted line, and Vdet2=(Cx1+Cx2)×$V_6$/C5 is satisfied.

Subsequently, at time $T_{31}$, the switch SW2 is turned off, and the switch SW1 and a switch SW3 are turned on. As a result, the electric potential of the detection electrode E3 is reduced to a low level equal to the electric potential of the AC rectangular wave Sg, and the voltage detector DET is reset. The operation described above is repeated at a predetermined frequency (e.g., several kilohertz to several hundred kilohertz). The detection circuit 40 thus can perform touch detection based on the basic principle of self-capacitance touch detection.

Figure 12:
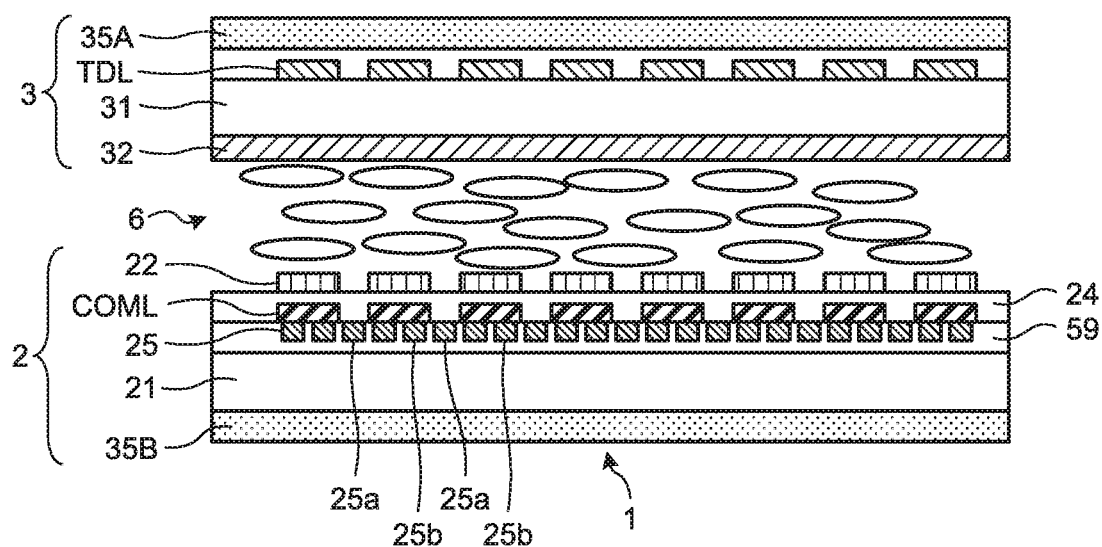
FIG. 12 is a sectional view of a schematic sectional structure of the display device according to the embodiment.

The following describes an exemplary configuration of the display device 1 according to the present embodiment in greater detail. FIG. 12 is a sectional view of a schematic sectional structure of the display device according to the embodiment. As illustrated in FIG. 12, the display panel 10 includes a pixel substrate 2, a counter substrate 3, and a liquid crystal layer 6 serving as a display functional layer. The counter substrate 3 is disposed facing the pixel substrate 2 in a direction perpendicular to the surface of the pixel substrate 2. The liquid crystal layer 6 is provided between the pixel substrate 2 and the counter substrate 3.

The pixel substrate 2 includes a first substrate 21, pixel electrodes 22, the third electrodes COML, first electrodes 25, and a polarizing plate 35B. The first substrate 21 is provided with circuits, such as a gate scanner included in the gate driver 12, switching elements, such as thin film transistors (TFTs), and various kinds of wiring (not illustrated in FIG. 12), such as gate lines GCL and signal lines SGL.

The first electrodes 25 are provided on the first substrate 21. The third electrodes COML are provided on the first electrodes 25 with an insulating layer 59 interposed therebetween. The first electrodes 25 are provided to a layer different from that of the third electrodes COML. First electrodes 25a denote a part of the first electrodes 25 disposed not under the third electrodes COML in planar view. First electrodes 25b denote the other part of the first electrodes 25 disposed under and in contact with the third electrodes COML in planar view. The pixel electrodes 22 are provided on the third electrodes COML with an insulating layer 24 interposed therebetween. The pixel electrodes 22 are disposed in a matrix (row-column configuration) in planar view. The polarizing plate 35B is provided under the first substrate 21.

In the present specification, "on" indicates a direction from the first substrate 21 toward a second substrate 31 in the direction perpendicular to the surface of the first substrate 21, and "under" indicates a direction from the second substrate 31 toward the first substrate 21. The "planar view" indicates a view seen in the direction perpendicular to the surface of the first substrate 21. In the following explanation and the drawings, the first electrodes 25b may not be illustrated.

The pixel electrodes 22 are provided corresponding to the respective sub-pixels SPix constituting each pixel Pix of the display panel 10. The pixel electrodes 22 are supplied with the pixel signals Vpix for performing a display operation. In the display operation, the third electrodes COML are supplied with the direct-current (DC) display drive signals Vcomdc to serve as common electrodes for a plurality of pixel electrodes 22. The first electrodes 25a serve as detection electrodes in mutual capacitance touch detection.

The pixel electrodes 22 and the third electrodes COML according to the present embodiment are made of a translucent conductive material, such as indium tin oxide (ITO). The first electrodes 25a and 25b may be made of a metal material including at least one of aluminum (Al), copper (Cu), silver (Ag), molybdenum (Mo), and an alloy of these metals.

The counter substrate 3 includes the second substrate 31, a color filter 32, the second electrodes TDL, and a polarizing plate 35A. The color filer 32 is provided to one surface of the second substrate 31. The second electrodes TDL are provided to the other surface of the second substrate 31. The second electrodes TDL are arrayed on the second substrate 31. The second electrodes TDL serve not only as drive electrodes in mutual capacitance touch detection but also as detection electrodes in self-capacitance hover detection.

The color filer 32 faces the liquid crystal layer 6 in the direction perpendicular to the first substrate 21. The color filter 32 may be disposed above the first substrate 21. The first substrate 21 and the second substrate 31 according to the present embodiment are glass substrates or resin substrates, for example.

The first substrate 21 and the second substrate 31 are disposed facing each other with a predetermined space interposed therebetween. The liquid crystal layer 6 is provided between the first substrate 21 and the second substrate 31. The liquid crystal layer 6 modulates light passing therethrough depending on the state of an electric field. The liquid crystal layer 6, for example, includes liquid crystals in a lateral electric-field mode, such as the in-plane switching (IPS) mode including the fringe field switching (FFS) mode. Orientation films 34A and 34B (not illustrated in FIG. 12) are provided between the liquid crystal layer 6 and the pixel substrate 2 and between the liquid crystal layer 6 and the counter substrate 3 illustrated in FIG. 12.

An illumination device (backlight), which is not illustrated, is provided under the first substrate 21. The illumination device includes a light source, such as a light emitting diode (LED), and outputs light from the light source to the first substrate 21. The light from the illumination device passes through the pixel substrate 2 and is modulated depending on the state of the liquid crystals at the corresponding position. The state of light transmission to the display surface varies depending on the positions. With this mechanism, an image is displayed on the display surface.

Figure 13:
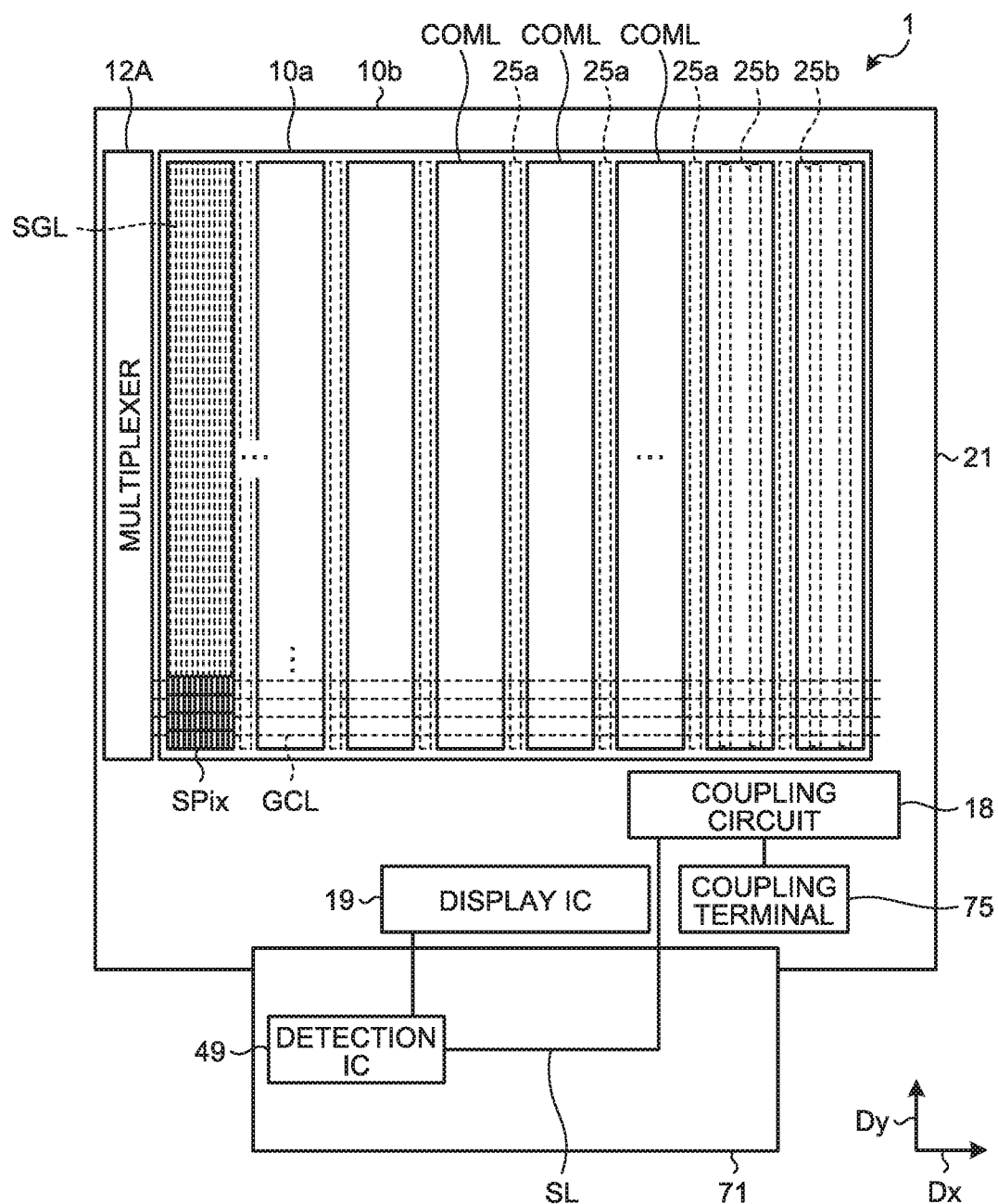
FIG. 13 is a plan view schematically illustrating a first substrate included in the display device.

FIG. 13 is a plan view schematically illustrating the first substrate included in the display device. As illustrated in FIG. 13, the display device 1 has a peripheral region 10b on the outside of an active area 10a. In the present specification, the active area 10a is an area for displaying an image and where a plurality of pixels Pix (sub-pixels SPix) are provided. The peripheral region 10b is a region positioned on the inner side than the outer periphery of the first substrate 21 and on the outer side than the active area 10a. The peripheral region 10b may have a frame shape surrounding the active area 10a. In this case, the peripheral region 10b may also be referred to as a frame region.

A first direction Dx according to the present embodiment extends along the long side of the active area 10a. A second direction Dy intersects the first direction Dx. The directions Dx and Dy are not limited thereto, and the second direction Dy may intersect the first direction Dx at an angle other than 90 degrees. The plane defined by the first direction Dx and the second direction Dy is parallel to the surface of the first substrate 21. The direction orthogonal to the first direction Dx and the second direction Dy is the thickness direction of the first substrate 21.

As illustrated in FIG. 13, the third electrodes COML extend in the second direction Dy and are arrayed in the first direction Dx in the active area 10a. In other words, the third electrodes COML extend along the short side of the active area 10a and are arrayed along the long side thereof.

As illustrated in FIG. 13, the first electrodes 25a and 25b extend in the second direction Dy and are arrayed in the first direction Dx in the active area 10a. The first electrode 25a is disposed between two third electrodes COML facing each other in the first direction Dx. The first electrode 25b is disposed under the third electrode COML. The first electrode 25a and the third electrode COML are alternately disposed in the first direction Dx. The first electrodes 25a and 25b and the third electrodes COML have a rectangular shape with their long sides extending in the second direction Dy. The length of the first electrodes 25a and 25b in the first direction Dx is shorter than that of the third electrode COML in the first direction Dx. The length of the first electrodes 25a and 25b in the second direction Dy is substantially equal to that of the third electrode COML in the second direction Dy. The length of the first electrodes 25a and 25b in the second direction Dy may be different from that of the third electrode COML in the second direction Dy.

While the third electrode COML has one continuous rectangular shape between two first electrodes 25a disposed side by side in the first direction Dx, the structure is not limited thereto. A plurality of third electrodes COML may be arrayed in the first direction Dx or the second direction Dy between the two first electrodes 25a facing each other in the first direction Dx.

A plurality of sub-pixels SPix are disposed in a matrix (row-column configuration) at a position corresponding to one third electrode COML. The sub-pixel SPix has an area smaller than that of the third electrode COML. The signal lines SGL and the gate lines GCL are each provided corresponding to a plurality of sub-pixels SPix. The signal lines SGL extend in the second direction Dy and are arrayed in the first direction Dx. The gate lines GCL intersect the signal lines SGL in planar view, extend in the first direction Dx, and are arrayed in the second direction Dy.

The third electrodes COML and the first electrodes 25a according to the present embodiment extend in a direction parallel to the extending direction of the signal lines SGL and in a direction intersecting the gate lines GCL in planar view. While FIG. 13 illustrates part of the sub-pixels SPix, the signal lines SGL, and the gate lines GCL, they are disposed across the whole area of the active area 10a.

The array of the pixel electrodes 22 is not limited to a matrix array in which they are arrayed in the first direction Dx and the second direction Dy intersecting the first direction Dx. Alternatively, pixel electrodes 22 facing each other may be disposed in a manner deviated in the first direction Dx or the second direction Dy. Still alternatively, pixel electrodes 22 facing each other may have different sizes, and two or three pixel electrodes 22 may be disposed on one side of one pixel electrode 22 included in a pixel column arrayed in the first direction Dx.

A multiplexer 12A is provided on the short side of the peripheral region 10b. The multiplexer 12A is a circuit coupled to the gate driver 12 (refer to FIG. 1) and has a function to select the gate lines GCL based on the control signals supplied from the control circuit 11.

The coupling circuit 18, a coupling terminal 75, and a display integrated circuit (IC) 19 are provided on the long side of the peripheral region 10b. A flexible substrate 71 is coupled to the long side of the peripheral region 10b. The flexible substrate 71 is provided with a detection IC 49. The display IC 19 serves as the control circuit 11 illustrated in FIG. 1. Part of the functions of the detection circuit 40 may be included in the detection IC 49 or provided as functions of an external micro-processing unit (MPU). The configuration of the display IC 19 or the detection IC 49 is not limited thereto, and the display IC 19 or the detection IC 49 may be provided to an external control substrate outside the module, for example.

The third electrodes COML and the first electrodes 25b disposed under them are electrically coupled to the display IC 19. The first electrodes 25a are electrically coupled to the detection IC 49 via or not via the coupling circuit 18.

In the display device 1 according to the present embodiment, the third electrodes COML and the first electrodes 25a extend in the direction intersecting the gate lines GCL. With this configuration, wiring (not illustrated) coupled to the third electrodes COML and the first electrodes 25a and circuits, such as the coupling circuit 18, can be provided in the peripheral region 10b at a position different from the position provided with the multiplexer 12A. Specifically, as illustrated in FIG. 13, the multiplexer 12A is provided on the short side of the peripheral region 10b, and circuits, such as the coupling circuit 18 and the display IC 19, are provided on the long side thereof, for example. Consequently, the display device 1 according to the present embodiment can make the peripheral region 10b along the third electrodes COML and the first electrodes 25a narrower.

Figure 14:
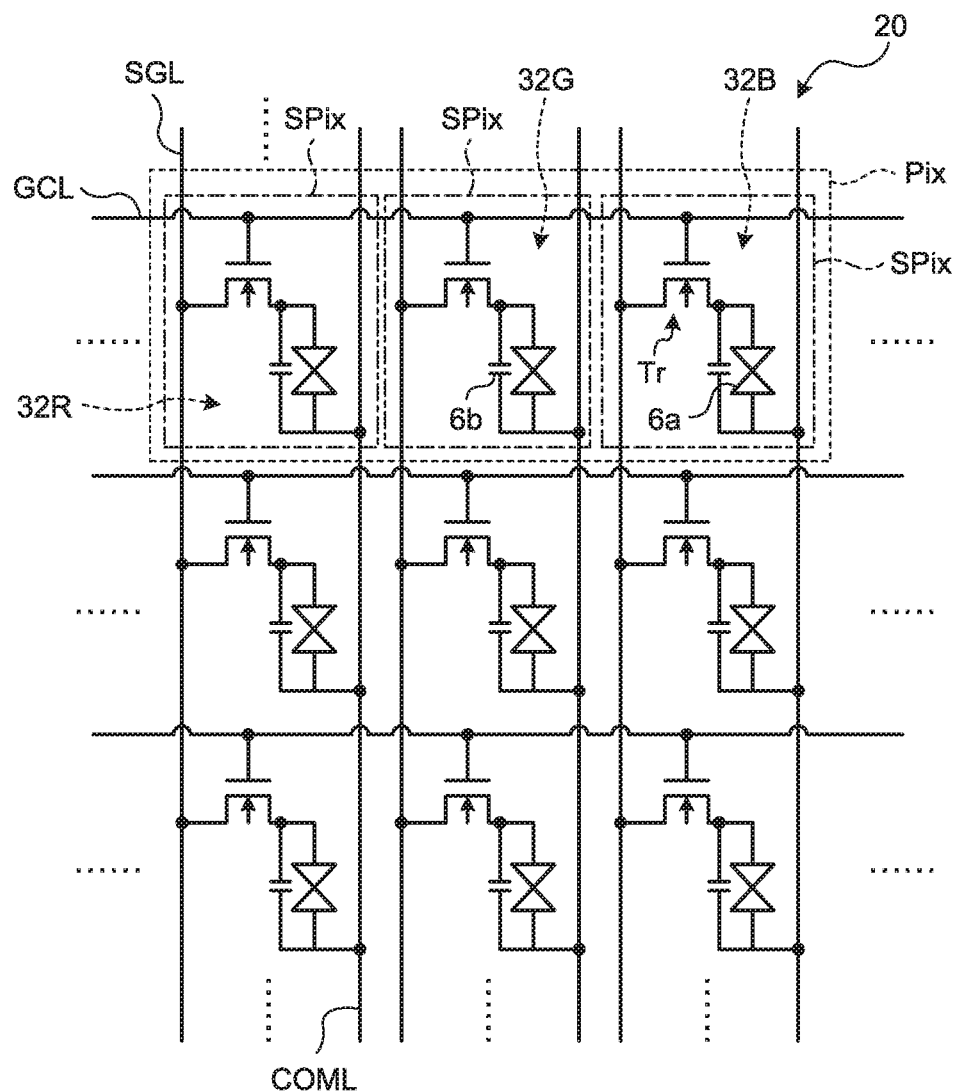
FIG. 14 is a circuit diagram of a pixel array in a display region according to the embodiment.

The following describes a display operation performed by the display panel 10. FIG. 14 is a circuit diagram of a pixel array in the display region according to the embodiment. The first substrate 21 (refer to FIG. 12) is provided with switching elements Tr of the respective sub-pixels SPix, the signal lines SGL, the gate lines GCL, and other components as illustrated in FIG. 14. The signal lines SGL are wiring that supplies the pixel signals Vpix to the pixel electrodes 22. The gate lines GCL are wiring that supplies drive signals for driving the switching elements Tr. The signal lines SGL and the gate lines GCL extend on a plane parallel to the surface of the first substrate 21.

The display region 20 illustrated in FIG. 14 includes a plurality of sub-pixels SPix arrayed in a matrix (row-column configuration). The sub-pixels SPix each include the switching element Tr and a liquid crystal element 6a. The switching element Tr is a thin-film transistor and is an n-channel metal oxide semiconductor (MOS) TFT in this example. The insulating layer 24 is provided between the pixel electrodes 22 and the third electrodes COML to form holding capacitance 6b illustrated in FIG. 14.

The gate driver 12 illustrated in FIG. 1 sequentially selects the gate line GCL. The gate driver 12 applies the scanning signals Vscan to the gates of the switching elements Tr of the respective sub-pixels SPix via the selected gate line GCL. As a result, one row (one horizontal line) out of the sub-pixels SPix is sequentially selected as a target of display drive. The source driver 13 supplies the pixel signals Vpix to the sub-pixels SPix included in the selected horizontal line via the signal lines SGL. The sub-pixels SPix perform display in units of one horizontal line based on the supplied pixel signals Vpix.

To perform the display operation, the drive circuit 14 applies the display drive signals Vcomdc to the third electrodes COML and the first electrodes 25a and 25b. The display drive signal Vcomdc is a voltage signal serving as a common potential for a plurality of sub-pixels SPix. As a result, the third electrodes COML and the first electrodes 25a serve as common electrodes for the pixel electrodes 22 in the display operation. To perform display, the drive circuit 14 applies the drive signals Vcomdc to all the third electrodes COML and the first electrodes 25a and 25b in the active area 10a.

The color filter 32 illustrated in FIG. 12 may include periodically arrayed color areas of the color filter in three colors of red (R), green (G), and blue (B), for example. Color areas 32R, 32G, and 32B in the three colors of R, G, and B, respectively, serve as a set and correspond to the respective sub-pixels SPix illustrated in FIG. 14. A pixel Pix is composed of a set of sub-pixels SPix corresponding to the respective color areas 32R, 32G, and 32B in the three colors. The color filter 32 may include color areas in four or more colors.

Figure 15:
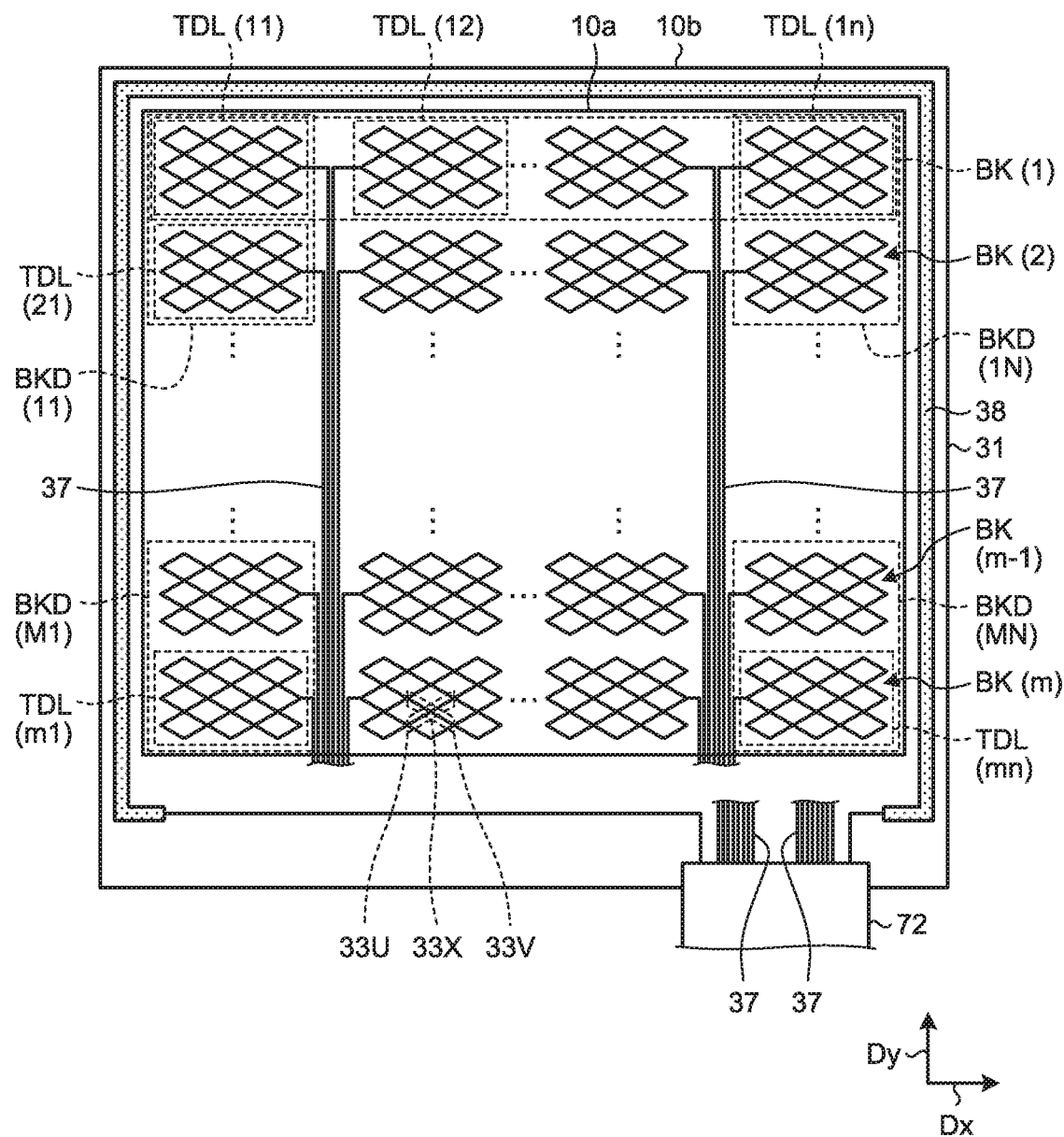
FIG. 15 is a plan view schematically illustrating a second substrate included in the display device.

The following describes the configuration of the second electrodes TDL. FIG. 15 is a plan view schematically illustrating the second substrate included in the display device. As illustrated in FIG. 15, the second electrodes TDL are arrayed in a matrix (row-column configuration) in the active area 10a of the second substrate 31. Second electrodes TDL(11), TDL(12), . . . , and TDL(1n) are arrayed in the first direction Dx, for example. Second electrodes TDL(11), TDL(21), . . . , and TDL(m1) are arrayed in the second direction Dy. The second electrodes TDL(11), TDL(12), . . . , TDL(1n), TDL(21), . . . , and TDL(m1) are simply referred to as the second electrodes TDL when they need not be distinguished from one another.

A guard ring 38 and a flexible substrate 72 are provided in the peripheral region 10b of the second substrate 31. The guard ring 38 is disposed surrounding the second electrodes TDL. Both ends of the guard ring 38 are electrically coupled to the flexible substrate 72.

The second electrode TDL includes a plurality of first conductive thin wires 33U and a plurality of second conductive thin wires 33V. The first conductive thin wire 33U and the second conductive thin wire 33V incline in opposite directions with respect to a direction parallel to the first direction Dx.

The first conductive thin wires 33U and the second conductive thin wires 33V each have a small width. In the active area 10a, the first conductive thin wires 33U are disposed with a space interposed therebetween in the second direction Dy. The second conductive thin wires 33V are disposed with a space interposed therebetween in the second direction Dy.

The second electrode TDL includes at least one first conductive thin wire 33U and at least one second conductive thin wire 33V intersecting the first conductive thin wire 33U. The first conductive thin wire 33U and the second conductive thin wire 33V are electrically coupled at a coupling region 33X. A plurality of first conductive thin wires 33U intersect a plurality of second conductive thin wires 33V at a plurality of intersections. With this structure, the shape of one mesh of the second electrode TDL is a parallelogram.

One end of the extending directions of the first conductive thin wires 33U and the second conductive thin wires 33V is coupled to a coupling wire 37. The coupling wire 37 passes between the second electrodes TDL facing each other in the first direction Dx, extends from the active area 10a, and is coupled to the flexible substrate 72 provided in the peripheral region 10b. With this configuration, the first conductive thin wires 33U and the second conductive thin wires 33V are electrically coupled and serve as one second electrode TDL. One second electrode TDL according to the present embodiment is coupled to one coupling wire 37. The second electrode TDL has a substantially rectangular shape. The shape is not limited thereto, and the second electrode TDL may have another shape, such as square, polygonal, and elliptic shapes.

The first conductive thin wires 33U and the second conductive thin wires 33V are metal layers made of one or more of Al, Cu, Ag, Mo, chromium (Cr), and tungsten (W). Alternatively, the first conductive thin wires 33U and the second conductive thin wires 33V are made of an alloy including one or more of these metal materials. The first conductive thin wires 33U and the second conductive thin wires 33V may be multilayered bodies composed of a plurality of conductive layers made of these metal materials or an alloy including one or more of these materials. The first conductive thin wires 33U and the second conductive thin wires 33V may be multilayered bodies composed of conductive layers made of translucent conductive oxide, such as ITO. Alternatively, the first conductive thin wires 33U and the second conductive thin wires 33V may be multilayered bodies composed of blackened films, black organic films, or black conductive organic films obtained by combining the metal materials described above and conductive layers.

The metal materials described above have resistance lower than that of translucent conductive oxide, such as ITO. The metal materials described above have a light-shielding property higher than that of the translucent conductive oxide. As a result, the transmittance may possibly be reduced, or the patterns of the second electrodes TDL may possibly be visually recognized. One second electrode TDL according to the present embodiment includes a plurality of first conductive thin wires 33U and a plurality of second conductive thin wires 33V. The first conductive thin wires 33U and the second conductive thin wires 33V are disposed with a space larger than their width interposed therebetween. This configuration can reduce the resistance and prevent the patterns of the second electrodes TDL from being visually recognized. As a result, the second electrodes TDL have lower resistance, and the display device 1 can have a smaller thickness, a larger screen, or higher definition.

The width of the first conductive thin wire 33U and the second conductive thin wire 33V is preferably 1 μm to 10 μm and more preferably 1 μm to 5 μm. If the width of the first conductive thin wire 33U and the second conductive thin wire 33V is 10 μm or smaller, the area of a portion covering apertures is reduced in the active area 10a, making the aperture ratio less likely to be reduced. The apertures correspond to regions in which transmission of light is not suppressed by a black matrix or the gate lines GCL and the signal lines SGL. If the width of the first conductive thin wire 33U and the second conductive thin wire 33V is 1 μm or larger, they have a stable shape, thereby being less likely to be broken.

The second electrode TDL does not necessarily include mesh-shaped metal thin wires and may include a plurality of zigzag-line-shaped or wavy-line-shaped metal thin wires, for example. Dummy electrodes not serving as detection electrodes may be provided between the second electrodes TDL. The dummy electrode may have a mesh-shaped, zigzag-line-shaped, or wavy-line-shaped pattern similar to that of the second electrode TDL.

The second electrodes TDL are coupled to the flexible substrate 72 via the respective coupling wires 37. The flexible substrate 72 is coupled to the coupling terminal 75 of the first substrate 21 illustrated in FIG. 13. Consequently, the second electrodes TDL are electrically coupled to the coupling circuit 18 via the respective coupling wires 37, the flexible substrate 72, and the coupling terminal 75.

The coupling circuit 18 switches the coupling state of the second electrodes TDL between touch detection and hover detection. In touch detection, the coupling circuit 18 according to the present embodiment electrically couples a plurality of second electrodes TDL arrayed in the first direction Dx based on the control signals supplied from the control circuit 11. Drive electrode blocks BK(1), BK(2), . . . , BK(m−1), and BK(m) each include a plurality of second electrodes TDL arrayed in the first direction Dx. The second electrodes TDL(11), TDL(12), . . . , and TDL(1n) are electrically coupled, whereby the drive electrode block BK(1) serves as one drive electrode, for example. In other words, one drive electrode block BK serves as one drive electrode including a plurality of second electrodes TDL arrayed in a certain row. In the following description, the drive electrode blocks BK(1), BK(2), . . . , BK(m−1), and BK(m) are simply referred to as drive electrode blocks BK when they need not be distinguished from one another. The configuration of the coupling circuit 18 will be described later.

Figure 16:
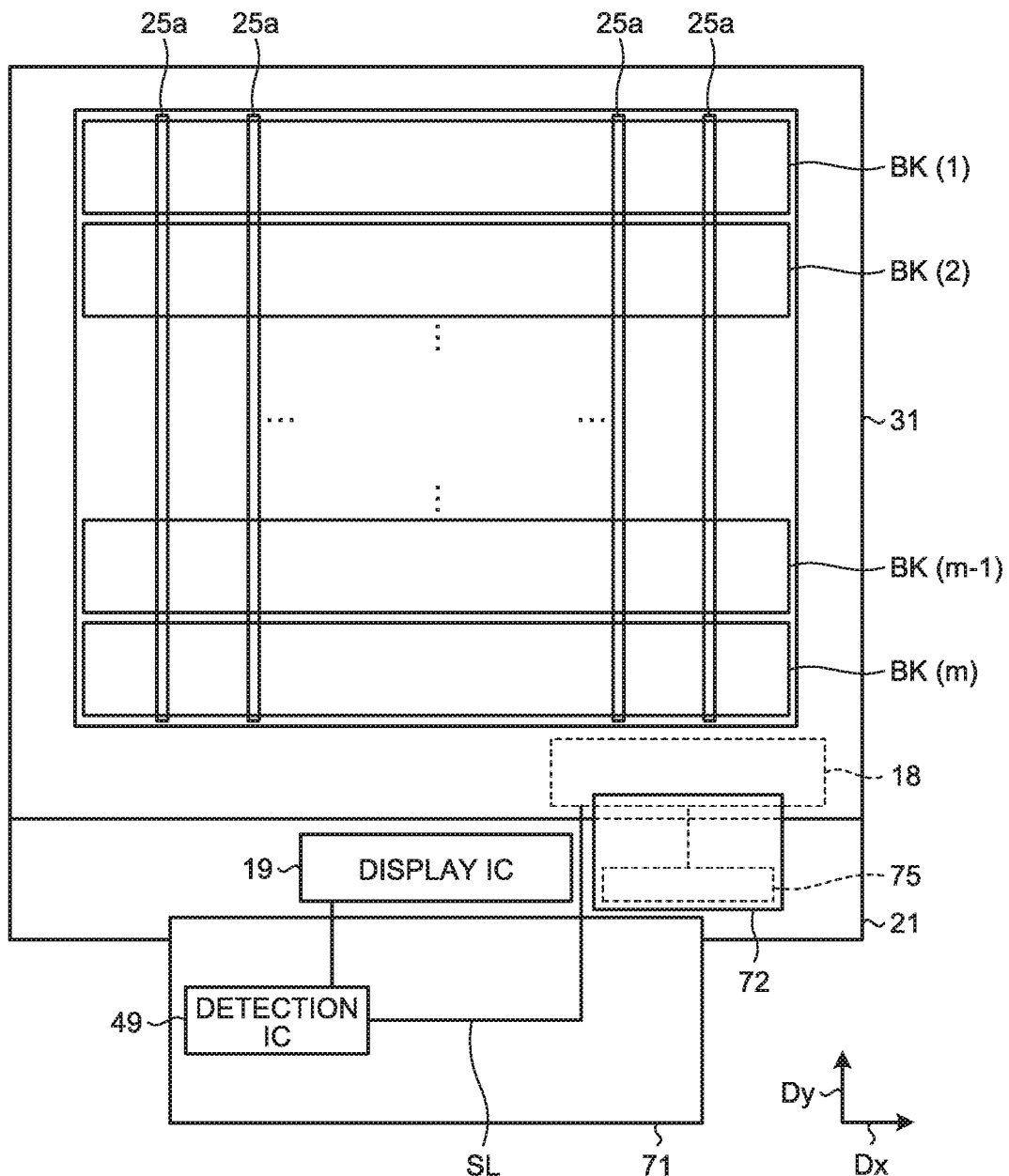
FIG. 16 is a diagram for explaining the relation between drive electrode blocks and first electrodes.

FIG. 16 is a diagram for explaining the relation between the drive electrode blocks BK and the first electrodes 25a. The drive electrode blocks BK extend in the first direction Dx and are arrayed in the second direction Dy. The drive electrode blocks BK are disposed intersecting the first electrodes 25a in planar view. The array pitch of the drive electrode blocks BK in the second direction Dy is equal to that of the second electrodes TDL in the second direction Dy. In the intersection regions of the drive electrode blocks BK and the first electrodes 25a, capacitance is formed between the second electrodes TDL included in the drive electrode blocks BK and the first electrodes 25a.

In touch detection, the drive circuit 14 (refer to FIG. 1) supplies the first drive signals Vcom1 to the drive electrode block BK via the coupling circuit 18. In other words, the drive circuit 14 collectively drives the second electrodes TDL included in the drive electrode block BK. The first electrodes 25a output, to the detection circuit 40, the first detection signals Vdet1 corresponding to changes in capacitance between the drive electrode block BK and the first electrodes 25a. Based on the first detection signals Vdet1, the detection circuit 40 performs touch detection by the mutual capacitance method described above, thereby detecting touch input. The drive circuit 14 sequentially drives the drive electrode blocks BK(1), BK(2), . . . , BK(m−1), and BK(m) in the active area 10a to perform touch detection. The coordinate extraction circuit 45 thus can detect the position of an object to be detected in the contact state.

As described above, the drive electrode block BK including a plurality of second electrodes TDL serves as one drive electrode in mutual capacitance touch detection. The first electrode 25a serves as a detection electrode.

In touch detection, the third electrodes COML (refer to FIG. 13) may be in a floating state where no voltage signal is supplied thereto and their electric potential is not fixed. Alternatively, the drive circuit 14 may supply voltage signals having a fixed electric potential to the third electrodes COML.

In touch detection, the drive circuit 14 supplies voltage signals synchronized with the first drive signals Vcom1 and having the same electric potential as that of the first drive signals Vcom1 to the guard ring 38. Alternatively, the drive circuit 14 may supply DC voltage signals having a fixed electric potential to the guard ring 38. This mechanism can reduce stray capacitance in the second electrodes TDL, thereby increasing the detection accuracy.

In hover detection, the coupling circuit 18 electrically couples a plurality of second electrodes TDL arrayed in the second direction Dy based on the control signals supplied from the control circuit 11. As illustrated in FIG. 15, detection electrode blocks BKD(11), BKD(N), BDK(M1), and BKD(MN) each include two second electrodes TDL arrayed in the second direction Dy, for example. The second electrodes TDL(11) and TDL(21) are electrically coupled, whereby the detection electrode block BKD(11) serves as one detection electrode, for example. With this configuration, the area of the detection electrode block BKD increases, thereby increasing the detection sensitivity in hover detection. While FIG. 15 illustrates part of the detection electrode blocks BKD, the detection electrode blocks BKD are arrayed in a matrix (row-column configuration) in the active area 10a. In other words, the detection electrode blocks BKD are arrayed in the first direction Dx and the second direction Dy. As described above, in touch detection (mutual method), the second electrodes TDL are collectively driven as the drive electrode blocks BK. In hover detection (self-method), the second electrodes TDL serve as the detection electrode blocks BKD.

The configuration is not limited to that described above, and the detection electrode block BKD may include three or more second electrodes TDL arrayed in the second direction Dy. The detection electrode block BKD may include one second electrode TDL. Alternatively, the detection electrode block BKD may include a plurality of second electrodes TDL arrayed in the first direction Dx. All the second electrodes TDL in the active area 10a, for example, may be electrically coupled and serve as one detection electrode block BKD.

In hover detection, the drive circuit 14 (refer to FIG. 1) sequentially or simultaneously supplies the second drive signals Vcom2 to the detection electrode block BKD via the coupling circuit 18. In other words, the drive circuit 14 collectively drives the second electrodes TDL included in the detection electrode block BKD. The detection electrode block BKD outputs, to the detection circuit 40 via the coupling circuit 18, the second detection signals Vdet2 corresponding to capacitance changes in the second electrodes TDL included in the detection electrode block BKD.

Based on the second detection signals Vdet2, the detection circuit 40 performs hover detection by the self-capacitance method described above. The detection circuit 40 can detect the position and a movement, such as a gesture, of an object to be detected in the non-contact state based on the second detection signals Vdet2 supplied from the detection electrode blocks BKD in the active area 10a.

Figure 17:
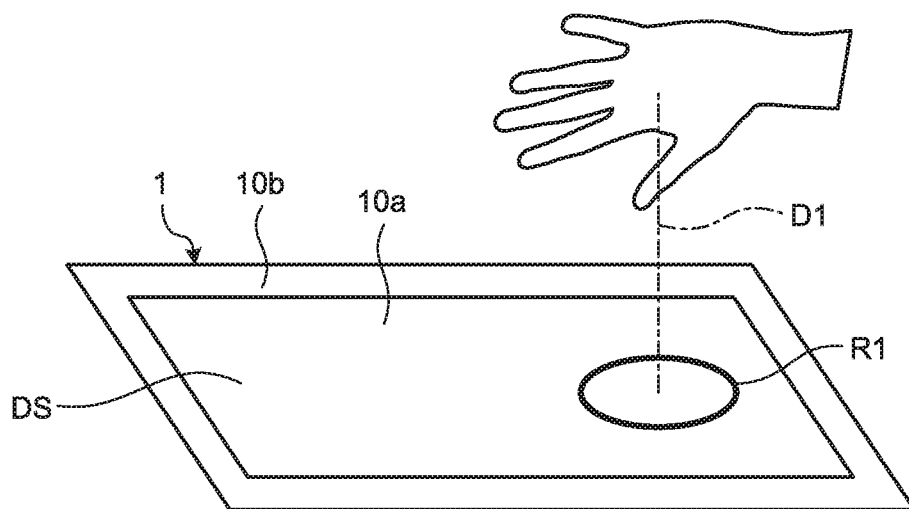
FIG. 17 is a diagram for explaining an example of hover detection according to the embodiment.
Figure 18:
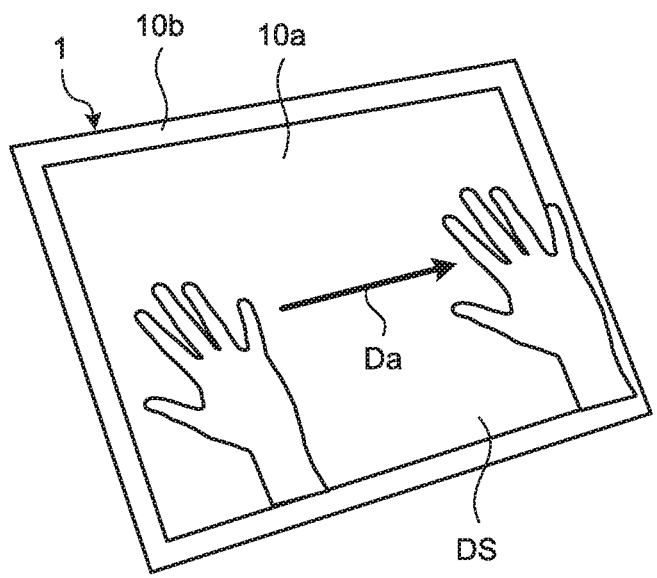
FIG. 18 is a diagram for explaining another example of hover detection according to the embodiment.

FIG. 17 is a diagram for explaining an example of hover detection according to the embodiment. FIG. 18 is a diagram for explaining another example of hover detection according to the embodiment. As illustrated in FIG. 17, the display device 1 performs hover detection when a finger of an operator serving as an object to be detected is not in contact with a display surface DS. The detection circuit 40 can detect a distance D1 between the display surface DS and the object to be detected in a direction perpendicular to the display surface DS based on the second detection signals Vdet2. The detection circuit 40 can also detect a position R1 of the object to be detected based on the second detection signals Vdet2. The position R1 of the object to be detected faces the object to be detected in the direction perpendicular to the display surface DS, for example. The position R1 corresponds to the detection electrode block BKD having the largest value out of the second detection signals Vdet2 supplied from the detection electrode blocks BKD.

As illustrated in FIG. 18, the display device 1 can also detect a movement, such as a gesture, of the object to be detected. When the object to be detected in the non-contact state with respect to the display surface DS moves in the direction of the arrow Da, the detection circuit 40 calculates the change in the position of the object to be detected based on the second detection signals Vdet2. The detection circuit 40 thus detects a movement, such as a gesture, of the object to be detected. Based on the results of hover detection, the control circuit 11 (refer to FIG. 1) performs a predetermined display operation or detection operation.

As described above, the detection electrode block BKD including a plurality of second electrodes TDL serves as one detection electrode in self-capacitance hover detection. In hover detection, the drive circuit 14 supplies the guard signals Vgd to the third electrodes COML and the first electrodes 25a. The third electrodes COML and the first electrodes 25a are driven at the same electric potential as that of the second electrodes TDL. This mechanism can reduce stray capacitance between the second electrodes TDL and the third electrodes COML and between the second electrodes TDL and the first electrodes 25a, thereby increasing the detection accuracy in hover detection. In other words, the third electrodes COML and the first electrodes 25a serve as guard electrodes in hover detection.

In hover detection, the drive circuit 14 supplies the guard signals Vgd to the guard ring 38. The guard signal Vgd is a voltage signal synchronized with the second drive signal Vcom2 and having the same electric potential as that of the second drive signal Vcom2. This mechanism can reduce stray capacitance in the second electrodes TDL, thereby increasing the detection accuracy.

As described above, the second electrodes TDL serve not only as drive electrodes in mutual capacitance touch detection but also as detection electrodes in self-capacitance hover detection. The detection electrode block BKD according to the present embodiment has an area larger than that of the second electrode TDL and the first electrode 25a. With this configuration, the lines of electric force of an electric field generated from the detection electrode block BKD reach a position away from the display surface DS. Consequently, the display device 1 can perform accurate touch detection and satisfactory hover detection using the second electrodes TDL both in touch detection and hover detection.

The second electrode TDL includes the first conductive thin wires 33U and the second conductive thin wires 33V. In the present specification, the area of the second electrode TDL or the area of the detection electrode block BKD includes not only the area of the first conductive thin wires 33U and the second conductive thin wires 33V but also the area of apertures surrounded by the first conductive thin wires 33U and the second conductive thin wires 33V. In other words, the area of the second electrode TDL or the area of the detection electrode block BKD corresponds to the area of the portion having a substantially rectangular shape and surrounding the first conductive thin wires 33U and the second conductive thin wires 33V.

The second electrodes TDL according to the present embodiment are provided to the second substrate 31. With this configuration, the space between the second electrodes TDL and various kinds of circuits, such as the switching elements Tr and the multiplexer 12A, and various kinds of wiring, such as the signal lines SGL and the gate lines GCL can be made larger than in a case where the second electrodes TDL are provided to the first substrate 21. Consequently, the present embodiment can reduce stray capacitance generated between the second electrodes TDL and the various kinds of circuits and wiring, thereby performing hover detection accurately.

Figure 19:
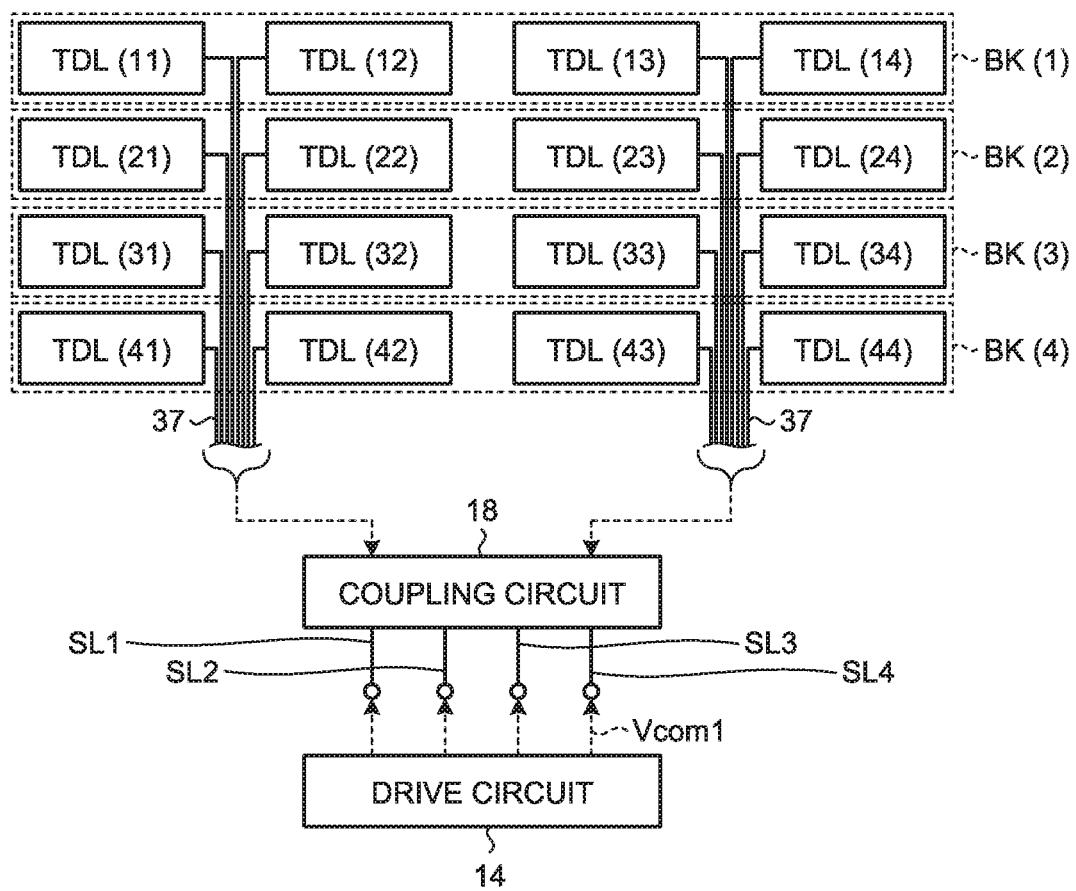
FIG. 19 is a diagram for explaining a coupling state of second electrodes in touch detection.
Figure 20:
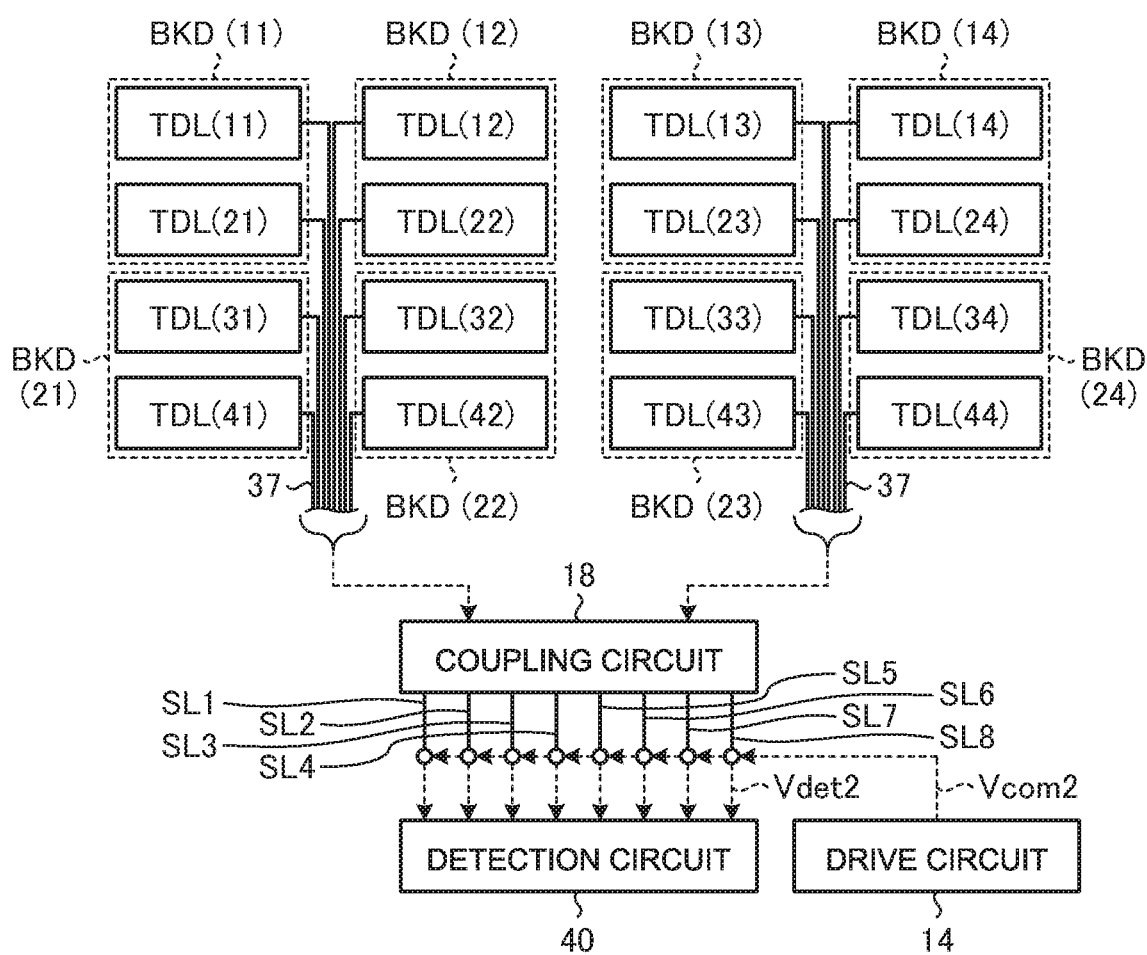
FIG. 20 is a diagram for explaining a coupling state of the second electrodes in hover detection.
Figure 21:
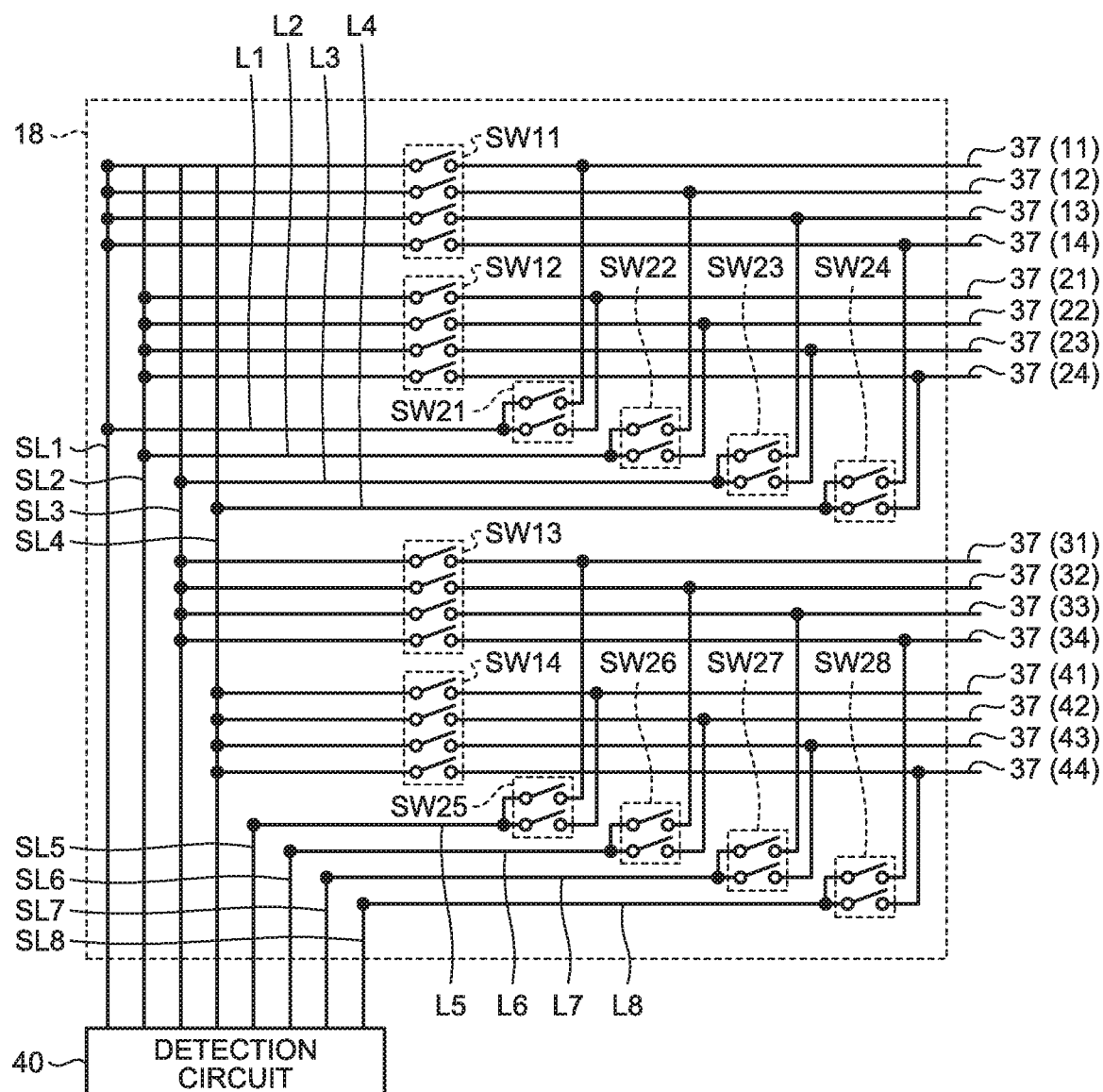
FIG. 21 is a circuit diagram of an example of a coupling circuit.

The following describes an example of a coupling configuration of the coupling circuit 18. FIG. 19 is a diagram for explaining a coupling state of the second electrodes in touch detection. FIG. 20 is a diagram for explaining a coupling state of the second electrodes in hover detection. FIG. 21 is a circuit diagram of an example of the coupling circuit.

To simplify the explanation, FIGS. 19 and 20 illustrate a configuration of the second electrodes TDL arrayed in four rows and four columns. As illustrated in FIGS. 19 and 20, the coupling circuit 18 is coupled to the second electrodes TDL via the respective coupling wires 37. As illustrated in FIG. 19, in touch detection, the coupling circuit 18 supplies the first drive signals Vcom1 supplied from the drive circuit 14 to the second electrodes TDL included in the drive electrode blocks BK. As illustrated in FIG. 20, in hover detection, the coupling circuit 18 supplies the second drive signals Vcom2 supplied from the drive circuit 14 to the second electrodes TDL included in the detection electrode blocks BKD. The coupling circuit 18 supplies the second detection signals Vdet2 output from the second electrodes TDL to the detection circuit 40.

As illustrated in FIG. 21, coupling wires 37(11), 37(12), . . . , and 37(44) coupled to the respective second electrodes TDL are coupled to the coupling circuit 18. The coupling wire 37(11) is coupled to the second electrode TDL(11) (refer to FIGS. 19 and 20), and the coupling wire 37(12) is coupled to the second electrode TDL(12). Similarly, the coupling wire 37(44) is coupled to the second electrode TDL(44). Four coupling wires 37(11), 37(12), 37(13), and 37(14), for example, are coupled to the respective four second electrodes TDL included in the drive electrode block BK(1) (refer to FIG. 19). Two coupling wires 37(11) and 37(21) are coupled to the respective two second electrodes TDL included in the detection electrode block BKD(11) (refer to FIG. 20).

The coupling circuit 18 includes first switches SW11, SW12, SW13, and SW14 and second switches SW21, SW22, SW23, SW24, SW25, SW26, SW27, and SW28. The first switches SW11 to SW14 and the second switches SW21 to SW28 are n-channel MOS TFTs, for example, and provided to the first substrate 21.

The four coupling wires 37(11), 37(12), 37(13), and 37(14) coupled to the drive electrode block BK(1) are coupled to a wire SL1 via the first switch SW11. The four coupling wires 37(21), 37(22), 37(23), and 37(24) coupled to the drive electrode block BK(2) are coupled to a wire SL2 via the first switch SW12. The four coupling wires 37(31), 37(32), 37(33), and 37(34) coupled to the drive electrode block BK(3) are coupled to a wire SL3 via the first switch SW13. The four coupling wires 37(41), 37(42), 37(43), and 37(44) coupled to the drive electrode block BK(4) are coupled to a wire SL4 via the first switch SW14.

The two coupling wires 37(11) and 37(21) coupled to the detection electrode block BKD(11) are coupled to a wire L1 via the second switch SW21. The wire L1 is coupled to the wire SL1. Similarly, sets of the two coupling wires 37 coupled to the respective detection electrode blocks BKD are coupled to the wires L2 to L8 via the second switches SW22 to SW28, respectively. The wires L2 to L8 are coupled to the wires SL2 to SL8, respectively. In the following description, the wires SL1 to SL8 are referred to as wires SL when they need not be distinguished from one another. The wires L1 to L8 are referred to as wires L when they need not be distinguished from one another.

The coupling circuit 18 switches on and off the first switches SW11 to SW14 and the second switches SW21 to SW28 based on the switch control signals Vss1 and Vss2 supplied from the control circuit 11. The first switches SW11 to SW14 and the second switches SW21 to SW28 perform switching operations opposite to each other. When the first switches SW11 to SW14 are turned on, for example, the second switches SW21 to SW28 are turned off. When the first switches SW11 to SW14 are turned off, the second switches SW21 to SW28 are turned on.

In touch detection, the coupling circuit 18 turns on the first switches SW11 to SW14 and turns off the second switches SW21 to SW28. As a result, the four coupling wires 37(11), 37(12), 37(13), and 37(14) coupled to the drive electrode block BK(1) are coupled to the wire SL1 via the first switch SW11. Similarly, sets of the four coupling wires 37 coupled to the respective drive electrode blocks BK(2) to BK(4) are coupled to the wires SL2 to SL4 via the first switches SW12 to SW14, respectively. In touch detection, the second switches SW21 and SW22 are turned off, and the coupling wires 37 are cut off from the wires L1 to L8.

As described above, the coupling circuit 18 couples the second electrodes TDL included in one drive electrode block BK to the corresponding one wire SL in touch detection. The drive circuit 14 supplies the first drive signals Vcom1 to the drive electrode block BK via the wire SL. The drive circuit 14 thus can collectively drive the second electrodes TDL included in the drive electrode block BK. Consequently, the drive electrode block BK serves as one drive electrode in touch detection.

In hover detection, the coupling circuit 18 turns off the first switches SW11 to SW14 and turns on the second switches SW21 to SW28. As a result, the two coupling wires 37(11) and 37(21) coupled to the detection electrode block BKD(11) are coupled to the wire L1 via the second switch SW21. The wire L1 is coupled to the wire SL1. Similarly, sets of the two coupling wires 37 coupled to the respective detection electrode blocks BKD are coupled to the wires L2 to L8 via the second switches SW22 to SW28, respectively. The wires L2 to L8 are coupled to the wires SL2 to SL8, respectively.

In hover detection, the first switches SW11 to SW14 are turned off. As a result, the four coupling wires 37 coupled to one drive electrode block BK are cut off from the corresponding one wire SL and coupled to respective different wires.

As described above, the coupling circuit 18 couples the second electrodes TDL included in one detection electrode block BKD to the corresponding one wire SL in hover detection. As illustrated in FIG. 20, the drive circuit 14 supplies the second drive signals Vcom2 to the detection electrode block BKD via the wire SL. The drive circuit 14 thus can collectively drive the second electrodes TDL included in the detection electrode block BKD. The second detection signals Vdet2 output from the detection electrode block BKD are supplied to the detection circuit 40 via the wire SL. Consequently, the detection electrode block BKD serves as one detection electrode in hover detection.

As described above, the coupling circuit 18 changes the number and the array of the second electrodes TDL coupled to one wire SL between touch detection and hover detection. Consequently, in touch detection, the second electrodes TDL arrayed in the first direction Dx are electrically coupled and serve as the drive electrode block BK. In hover detection, the second electrodes TDL arrayed in the second direction Dy are electrically coupled and serve as the detection electrode block BKD.

The configuration of the coupling circuit 18 illustrated in FIG. 21 is given by way of example only and may be appropriately modified. Three or more coupling wires 37 may be coupled to one wire L, for example. Alternatively, two or more wires L1 out of the wires L1 to L8 may be coupled to one wire SL.

Figure 22:
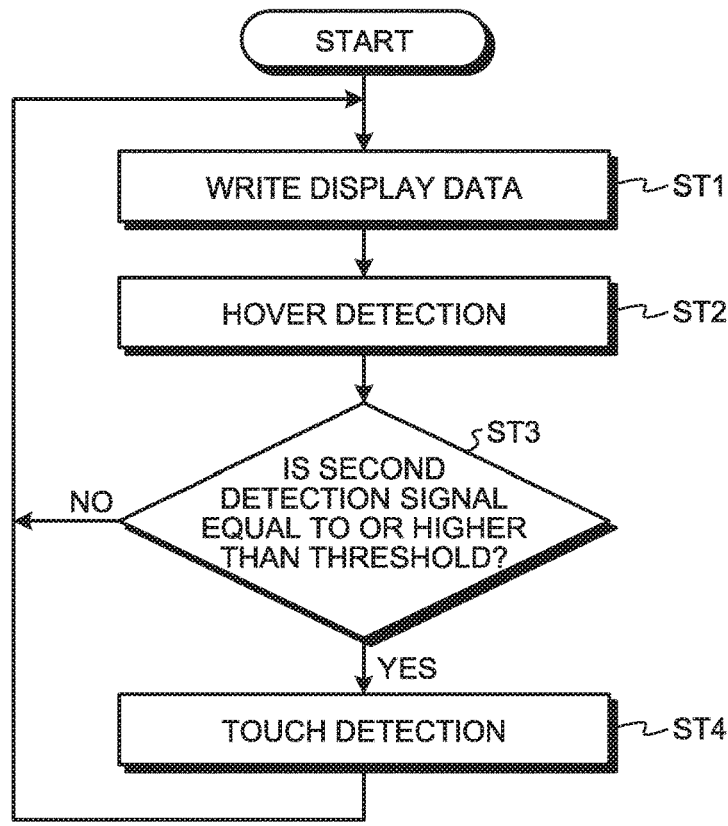
FIG. 22 is a flowchart of an exemplary operation performed by the display device according to the embodiment.
Figure 23:
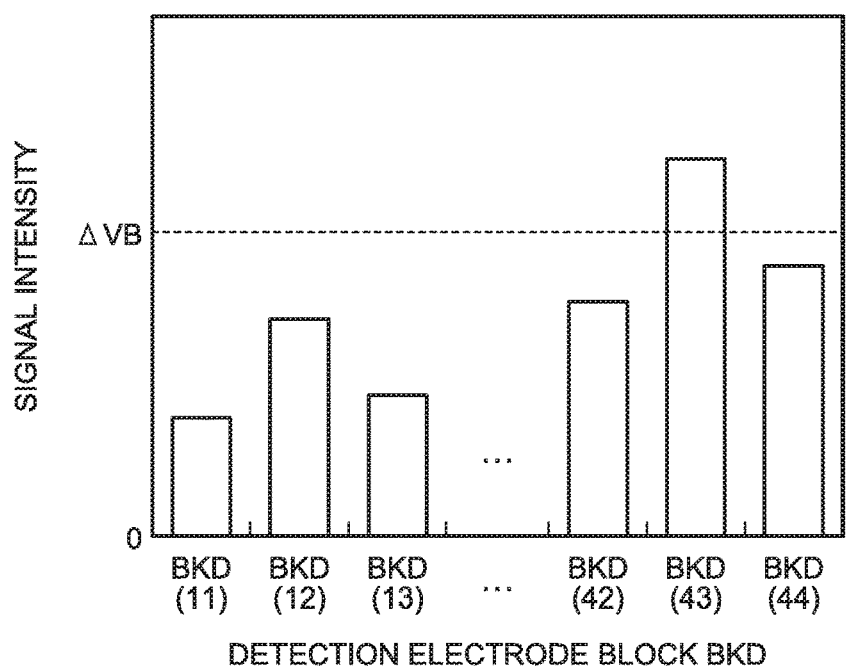
FIG. 23 is a graph schematically illustrating the relation between the detection electrode blocks and the signal intensity.
Figure 24:
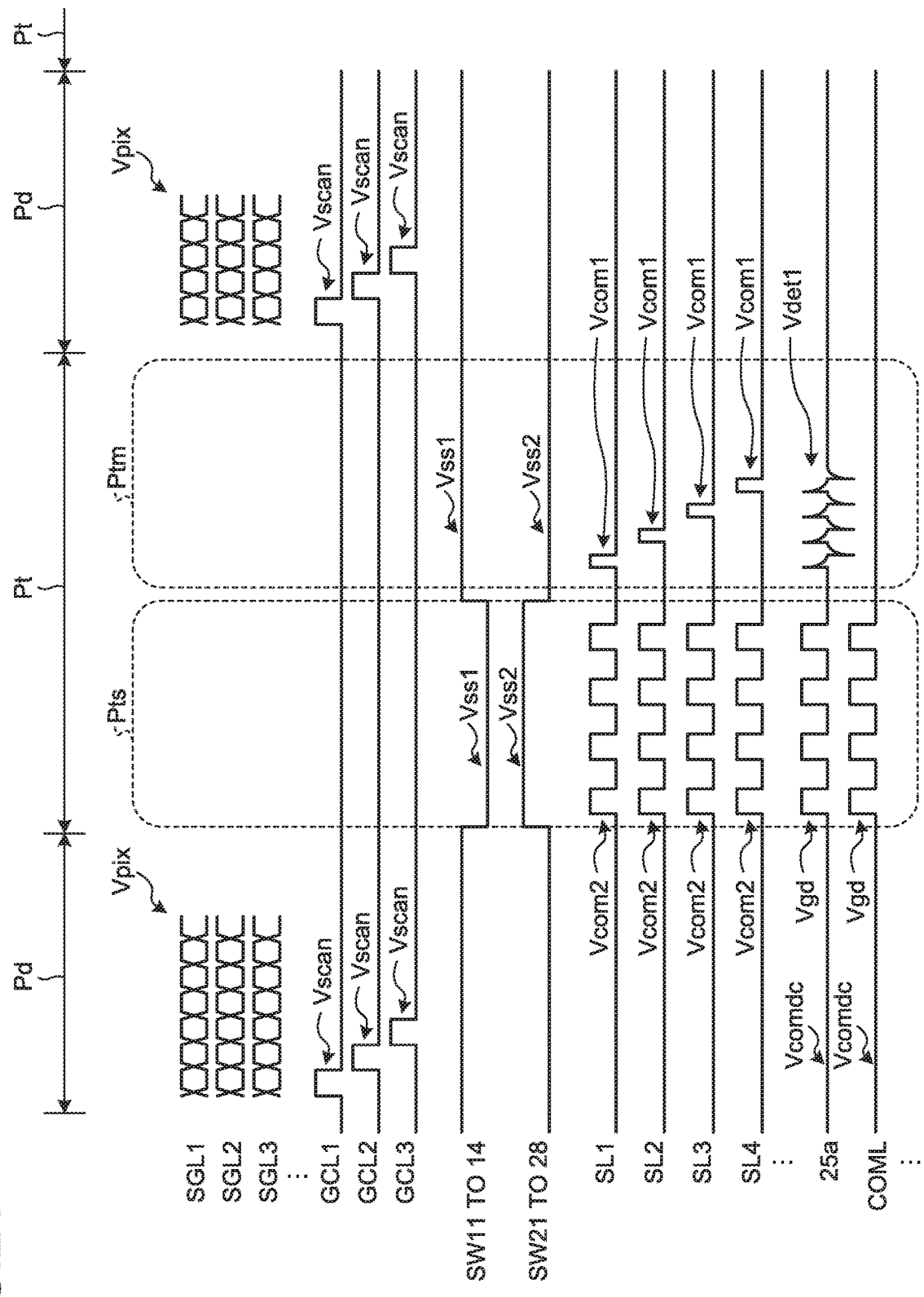
FIG. 24 is a timing waveform chart of the exemplary operation performed by the display device according to the embodiment.

The following describes an exemplary operation according to the present embodiment with reference to FIG. 1 and FIGS. 22 to 24. FIG. 22 is a flowchart of an exemplary operation performed by the display device according to the embodiment. FIG. 23 is a graph schematically illustrating the relation between the detection electrode blocks and the signal intensity. FIG. 24 is a timing waveform chart of the exemplary operation performed by the display device according to the embodiment. The exemplary operation illustrated in FIGS. 22 to 24 is given by way of example only and may be appropriately modified.

As illustrated in FIG. 24, display periods Pd and detection periods Pt are alternately arranged in a time-division manner. The detection period Pt includes a hover detection period Pts and a touch detection period Ptm. The execution order of the display period Pd, the hover detection period Pts, and the touch detection period Ptm is given by way of example only and may be appropriately modified. One detection period Pt, for example, may include only one of the hover detection period Pts and the touch detection period Ptm. The display device 1 may perform touch detection on one detection surface in one touch detection period Ptm or a plurality of touch detection periods Ptm. The display device 1 may display an image of one frame in one display period Pd. Alternatively, a plurality of display periods Pd and a plurality of detection periods Pt may be alternately arranged in a display period for an image of one frame.

As illustrated in FIG. 22, the control circuit 11 writes display data first (Step ST1). Specifically, similarly to the display operation described above, the source driver 13 supplies the pixel signals Vpix to the sub-pixels SPix corresponding to gate lines GCL1, GCL2, and GCL3 via signal lines SGL1, SGL2, and SGL3. The sub-pixels SPix perform display in units of one horizontal line based on the supplied pixel signals Vpix. As illustrated in FIG. 24, the drive circuit 14 supplies the display drive signals Vcomdc to the third electrodes COML and the first electrodes 25a in the display period Pd.

Subsequently, the control circuit 11 performs hover detection (Step ST2). Specifically, as illustrated in FIG. 24, the control circuit 11 supplies the switch control signal Vss1 at a low level to the coupling circuit 18 and supplies the switch control signal Vss2 at a high level to the coupling circuit 18 in the hover detection period Pts. The switch control signals Vss1 and Vss2 turn off the first switches SW11 to SW14 (refer to FIG. 21) and turn on the second switches SW21 to SW28 (refer to FIG. 21). As a result, the two second electrodes TDL arrayed in the second direction Dy are electrically coupled and serve as one detection electrode block BKD.

The drive circuit 14 supplies the second drive signals Vcom2 to the detection electrode blocks BKD (refer to FIG. 20) via the wires SL1, SL2, SL3, SL4 . . . . Consequently, the display device 1 can detect an object to be detected in the non-contact state on each of the detection electrode blocks BKD including two second electrodes TDL arrayed in the second direction Dy. The detection circuit 40, for example, can detect the distance D1 between the display surface DS and the object to be detected in the direction perpendicular to the display surface DS based on the second detection signals Vdet2 supplied from the respective detection electrode blocks BKD. The detection circuit 40 can also detect the position R1 of the object to be detected based on the second detection signals Vdet2 supplied from the respective detection electrode blocks BKD. The drive circuit 14 supplies the guard signals Vgd to the third electrodes COML and the first electrodes 25a in the hover detection period Pts.

Subsequently, the detection circuit 40 determines whether the second detection signals Vdet2 supplied from the respective detection electrode blocks BKD are equal to or higher than a predetermined threshold ΔVB (Step ST3). As illustrated in FIG. 23, the detection circuit 40 calculates the signal intensities of the second detection signals Vdet2 supplied from the respective detection electrode blocks BKD and compares them with the predetermined threshold ΔVB.

If the signal intensity of any one of the second detection signals Vdet2 is equal to or higher than the threshold ΔVB (Yes at Step ST3), the control circuit 11 performs touch detection (Step ST4). If the signal intensity of the second detection signal Vdet2 is equal to or higher than the threshold ΔVB, the detection circuit 40 determines that the object to be detected is in the contact state. In the example illustrated in FIG. 23, the signal intensity of the second detection signal Vdet2 supplied from the detection electrode block BKD(43) is equal to or higher than the threshold ΔVB. The signal intensities of the second detection signals Vdet2 supplied from the other detection electrode blocks BKD are lower than the threshold ΔVB. In this case, the detection circuit 40 determines that the object to be detected is in the contact state at a position corresponding to the detection electrode block BKD(43). The control circuit 11 switches from hover detection to touch detection based on the information supplied from the detection circuit 40.

Specifically, as illustrated in FIG. 24, the control circuit 11 supplies the switch control signal Vss1 at a low level to the coupling circuit 18 and the switch control signal Vss2 at a high level to the coupling circuit 18 in the touch detection period Ptm. The switch control signals Vss1 and Vss2 turn on the first switches SW11 to SW14 (refer to FIG. 21) and turn off the second switches SW21 to SW28 (refer to FIG. 21). As a result, the four second electrodes TDL arrayed in the first direction Dx are electrically coupled and serve as one drive electrode block BK.

The drive circuit 14 supplies the first drive signals Vcom1 to the drive electrode blocks BK (refer to FIG. 19) via the wires SL1, SL2, SL3, SL4 . . . . The first electrodes 25a supply, to the detection circuit 40, the first detection signals Vdet1 corresponding to changes in capacitance between the second electrodes TDL included in the drive electrode blocks BK and the first electrodes 25a. Consequently, the display device 1 can detect the object to be detected in the contact state on each of the drive electrode blocks BK including four second electrodes TDL arrayed in the first direction Dx.

In the touch detection period Ptm, if the detection operation on one detection surface is finished, that is, if the control circuit 11 sequentially supplies the first drive signals Vcom1 to all the drive electrode blocks BK to perform touch detection, the control circuit 11 finishes touch detection and returns to writing of display data (Step ST1).

If the signal intensities of all the second detection signals Vdet2 are lower than the threshold $\Delta$VB (No at Step ST3), the control circuit 11 does not perform touch detection and returns to writing of display data (Step ST1). In this case, in the detection period Pt illustrated in FIG. 24, the control circuit 11 performs only the processing of the hover detection period Pts and does not perform the processing of the touch detection period Ptm. In other words, only the hover detection period Pts is present in one detection period Pt.

The signal lines SGL, which are not illustrated in FIG. 24, are preferably in a floating state in the hover detection period Pts and the touch detection period Ptm. Making the signal lines SGL into a floating state can reduce capacitance between the second electrodes TDL and the signal lines SGL. The gate lines GCL may be in a floating state in the hover detection period Pts.

The exemplary operation illustrated in FIGS. 22 to 24 is given by way of example only and may be appropriately modified. The display device 1, for example, may perform hover detection on different second electrodes TDL included in one detection electrode block BKD in a plurality of hover detection periods Pts. The control circuit 11 can change the resolution in hover detection by changing the number of second electrodes TDL included in one detection electrode block BKD depending on the distance D1 between the display surface DS and the object to be detected.

Figure 25:
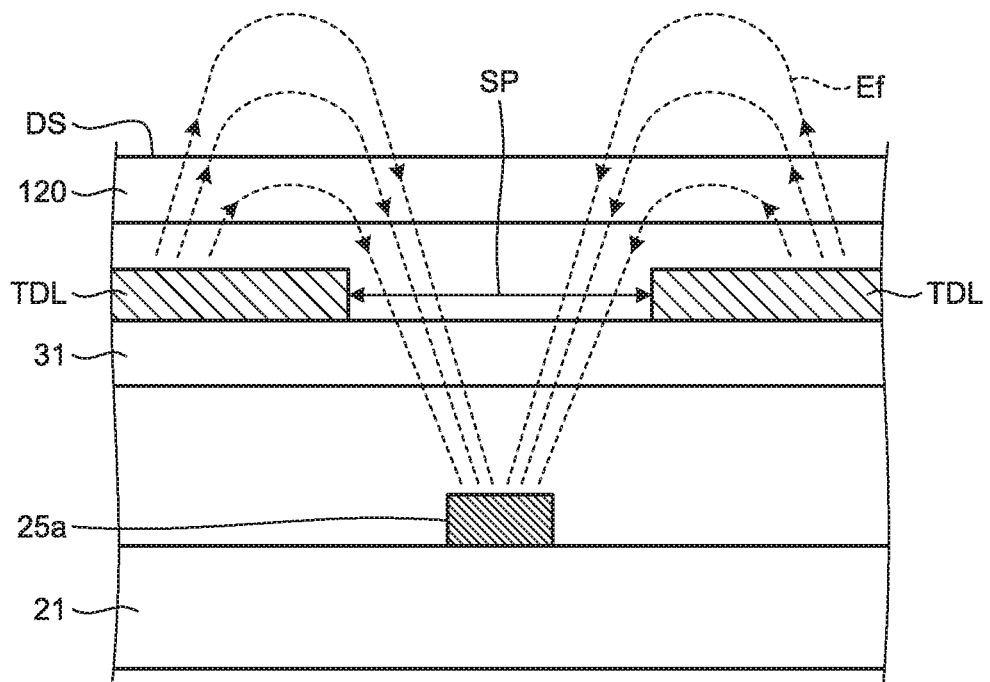
FIG. 25 is a diagram for explaining lines of electric force of a fringe electric field generated between the first electrode and the second electrodes in touch detection.
Figure 26:
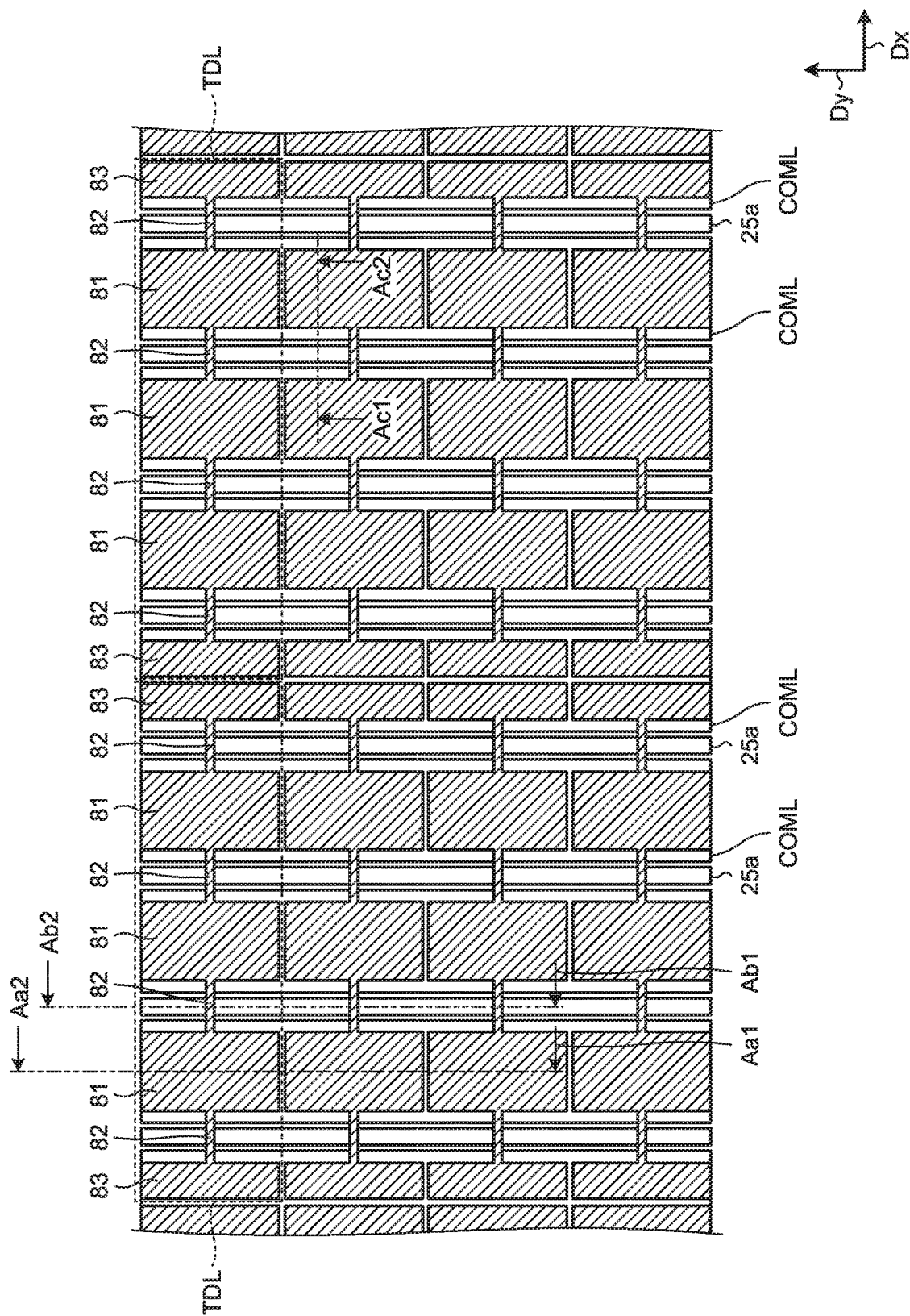
FIG. 26 is a plan view of the relation among the first electrodes, the second electrodes, and third electrodes.
Figure 27:
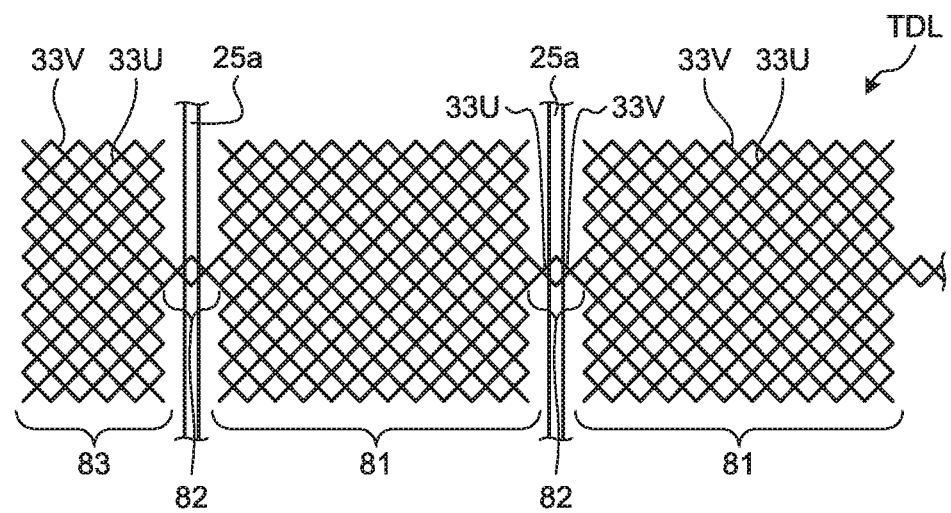
FIG. 27 is a plan view illustrating the second electrode in an enlarged manner.
Figure 28:
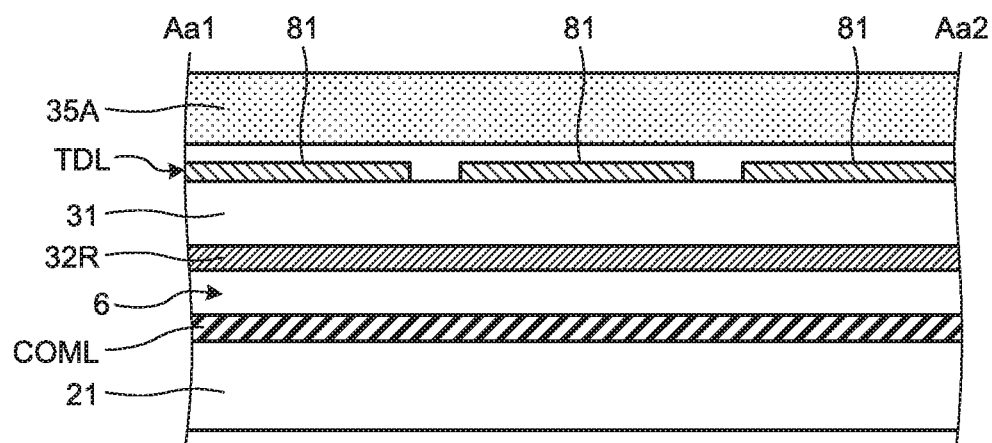
FIG. 28 is a sectional view along line Aa1-Aa2 in FIG. 26.
Figure 29:
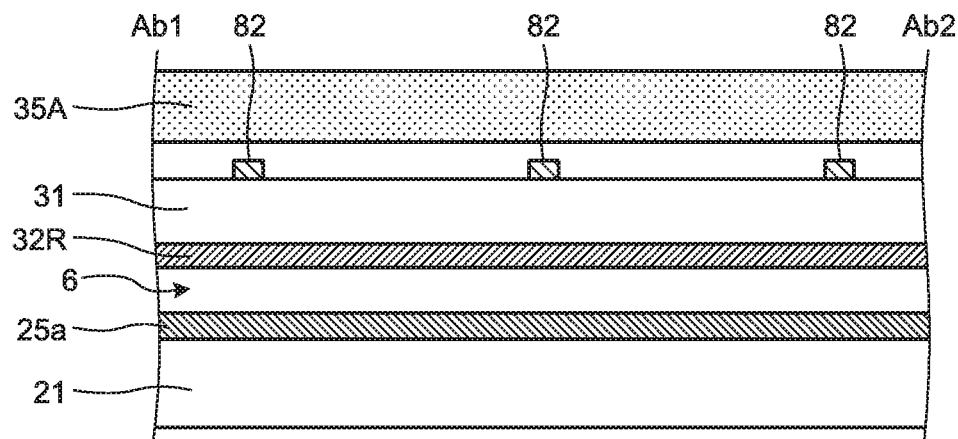
FIG. 29 is a sectional view along line Ab1-Ab2 in FIG. 26.
Figure 30:
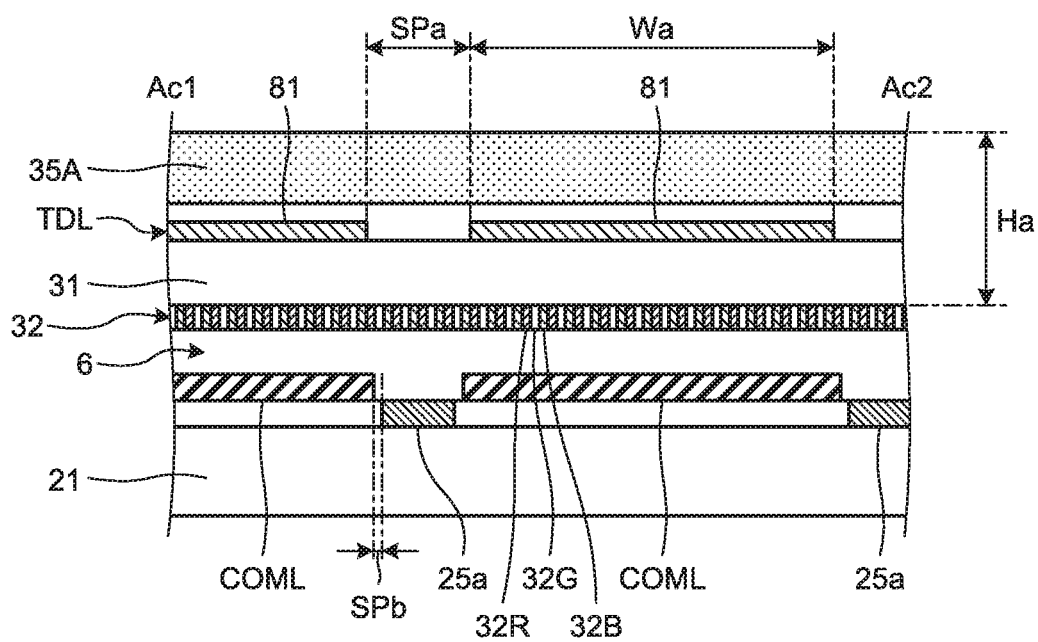
FIG. 30 is a sectional view along line Ac1-Ac2 in FIG. 26.

The following describes the configuration of the second electrodes TDL in greater detail. FIG. 25 is a diagram for explaining lines of electric force of a fringe electric field generated between the first electrode and the second electrodes in touch detection. FIG. 26 is a plan view of the relation among the first electrodes, the second electrodes, and the third electrodes. FIG. 27 is a plan view illustrating the second electrode in an enlarged manner. FIG. 28 is a sectional view along line Aa1-Aa2 in FIG. 26. FIG. 29 is a sectional view along line Ab1-Ab2 in FIG. 26. FIG. 30 is a sectional view along line Ac1-Ac2 in FIG. 26. The sectional views in FIGS. 28 to 30 schematically illustrate the positional relation among the first electrodes 25a, the second electrodes TDL, and the third electrodes COML. FIGS. 25 to 30 do not illustrate the first electrodes 25b disposed under the third electrodes COML.

As illustrated in FIG. 25, the second electrodes TDL provided to the second substrate 31 are disposed above the first electrodes 25a provided to the first substrate 21. As described above, the second electrodes TDL serve as drive electrodes in mutual capacitance touch detection and as detection electrodes in self-capacitance hover detection. As illustrated in FIG. 25, when the first drive signals Vcom1 are supplied to the second electrodes TDL in touch detection, lines of electric force Ef of a fringe electric field are generated between the second electrodes TDL and the first electrode 25a. The lines of electric force Ef of the fringe electric field extend from the second electrodes TDL to the upper side than the display surface DS and pass through a space SP between the second electrodes TDL facing each other. In FIG. 25, the display surface DS corresponds to the surface of a cover glass 120. The display surface DS is not limited thereto and may be the surface of another member provided at the uppermost part of the display device 1 or the surface of a protective layer provided to the second substrate 31.

By increasing the area of the second electrode TDL in planar view, the detection sensitivity in hover detection can be increased. Increasing the area of the second electrode TDL in planar view, however, makes the space SP between the facing second electrodes TDL smaller. In this case, the number of lines of electric force Ef in the fringe electric field passing through the space SP may possibly be reduced, resulting in reduced detection sensitivity in touch detection.

As illustrated in FIG. 26, the second electrode TDL has a first portion 81, a second portion 82, and a third portion 83. To simplify the drawing, the first portion 81, the second portion 82, and the third portion 83 have a rectangular shape in FIG. 26. As illustrated in FIG. 27, the first portion 81, the second portion 82, and the third portion 83 include the first conductive thin wires 33U and the second conductive thin wires 33V described above. In the first portion 81, the second portion 82, and the third portion 83, the first conductive thin wires 33U and the second conductive thin wires 33V intersect each other to have a mesh shape. In the first portion 81, the second portion 82, and the third portion 83, the first conductive thin wires 33U and the second conductive thin wires 33V are preferably provided at the same inclination angle and the same array pitch. This structure can provide satisfactory display characteristics.

As illustrated in FIG. 26, one second electrode TDL includes three first portions 81, four second portions 82, and two third portions 83 coupled to each other. With this structure, the second electrode TDL has a substantially rectangular shape as a whole with its long side extending in the first direction Dx. As illustrated in FIG. 26, the first portions 81 are arrayed in the first direction Dx in one second electrode TDL. As illustrated in FIGS. 26 and 30, the first portions 81 are disposed overlapping the third electrodes COML arrayed in the first direction Dx and not overlapping the first electrodes 25a in planar view.

In the second electrode TDL, a width Wa of the first portion 81, that is, the length in the first direction Dx is approximately 4 mm to 5 mm, for example. A space SPa between the facing first portions 81 is approximately 600 μm to 1 mm, for example. The third electrode COML has a width equal to or slightly larger than that of the first portion 81. The first electrode 25a has a width slightly smaller than that of the space SPa. A space SPb between the first electrode 25a and the third electrode COML is approximately 3 μm, for example. A total height Ha from the upper surface of the polarizing plate 35A to the lower surface of the second substrate 31 is approximately 500 μm, for example. The color areas 32R, 32G, and 32B of the color filter 32 are repeatedly arrayed at the position under the first portion 81 and the position under the space SPa. As described above, a set of the color areas 32R, 32G, and 32B corresponds to one pixel Pix. In other words, the first electrode 25a is provided across a plurality of pixels Pix. With this configuration, the lines of electric force Ef (refer to FIG. 25) of the fringe electric field pass through the space SPa and reach the first electrode 25a in touch detection. Consequently, the display device 1 can perform touch detection satisfactorily.

As illustrated in FIG. 26, the second portion 82 couples the first portions 81 disposed side by side in the first direction Dx. The second portion 82 has a width smaller than that of the first portion 81. The length of the second portion 82 in the second direction Dy is shorter than that of the first portion 81 in the second direction Dy. As illustrated in FIGS. 26 and 29, the second portion 82 intersects the first electrode 25a in planar view. The first portion 81 has an area larger than that of the second portion 82 and has a function mainly as a detection electrode or a drive electrode.

The third portions 83 are disposed at both ends of the second electrode TDL. One of the third portions 83 faces the first portion 81 disposed at one end out of the first portions 81 arrayed in the first direction Dx. The other of the third portions 83 faces the first portion 81 disposed at the other end. The first portion 81 and the third portion 83 facing each other in the first direction Dx are coupled by the second portion 82. The third portion 83 is disposed overlapping the third electrode COML and not overlapping the first electrode 25a in planar view. The third portion 83 has an area smaller than that of the first portion 81. The length of the third portion 83 in the first direction Dx is approximately half the length of the first portion 81 in the first direction Dx.

As described above, the second electrodes TDL are arrayed in a matrix (row-column configuration). As illustrated in FIG. 26, in two second electrodes TDL facing each other in the first direction Dx, the respective third portions 83 are disposed facing each other in the first direction Dx. The two third portions 83 are disposed overlapping one third electrode COML and not overlapping the first electrode 25a. As illustrated in FIGS. 26 and 28, the first portions 81 are arrayed in the second direction Dy overlapping one third electrode COML. The first portions 81 arrayed in the second direction Dy are separated from each other and included in respective different second electrodes TDL. The third portions 83 are arrayed in the second direction Dy overlapping one third electrode COML. FIGS. 28 and 29 illustrate the color area 32R of the color filter 32 extending in the second direction Dy. The configuration is not limited thereto, and the color area may be the color area 32G or the color area 32B.

As described above, the second electrode TDL has the first portions 81, the second portions 82, and the third portions 83. Electrical coupling of the first portions 81 can increase the substantial area of the second electrode TDL. With this structure, the detection sensitivity in hover detection can be increased.

The first portions 81 are provided not overlapping the first electrodes 25a. In touch detection, the lines of electric force Ef (refer to FIG. 25) of the fringe electric field pass through the space between the first portions 81 facing each other in the first direction Dx and extend toward the first electrodes 25a. In other words, a larger number of lines of electric force Ef in the fringe electric field extend than in a case where the first portions 81 are disposed overlapping the first electrode 25 with no second portion 82 provided. With this configuration, the display device 1 can increase the detection sensitivity in touch detection. Consequently, the display device 1 according to the present embodiment can perform touch detection and hover detection satisfactorily using the second electrodes TDL both in touch detection and hover detection.

The configuration of the second electrodes TDL is not limited to that illustrated in FIG. 26. The number of first portions 81 included in one second electrode TDL may be two or less or four or more. The third portion 83 may be disposed at only one end and may not be disposed at the other end.

Figure 31:
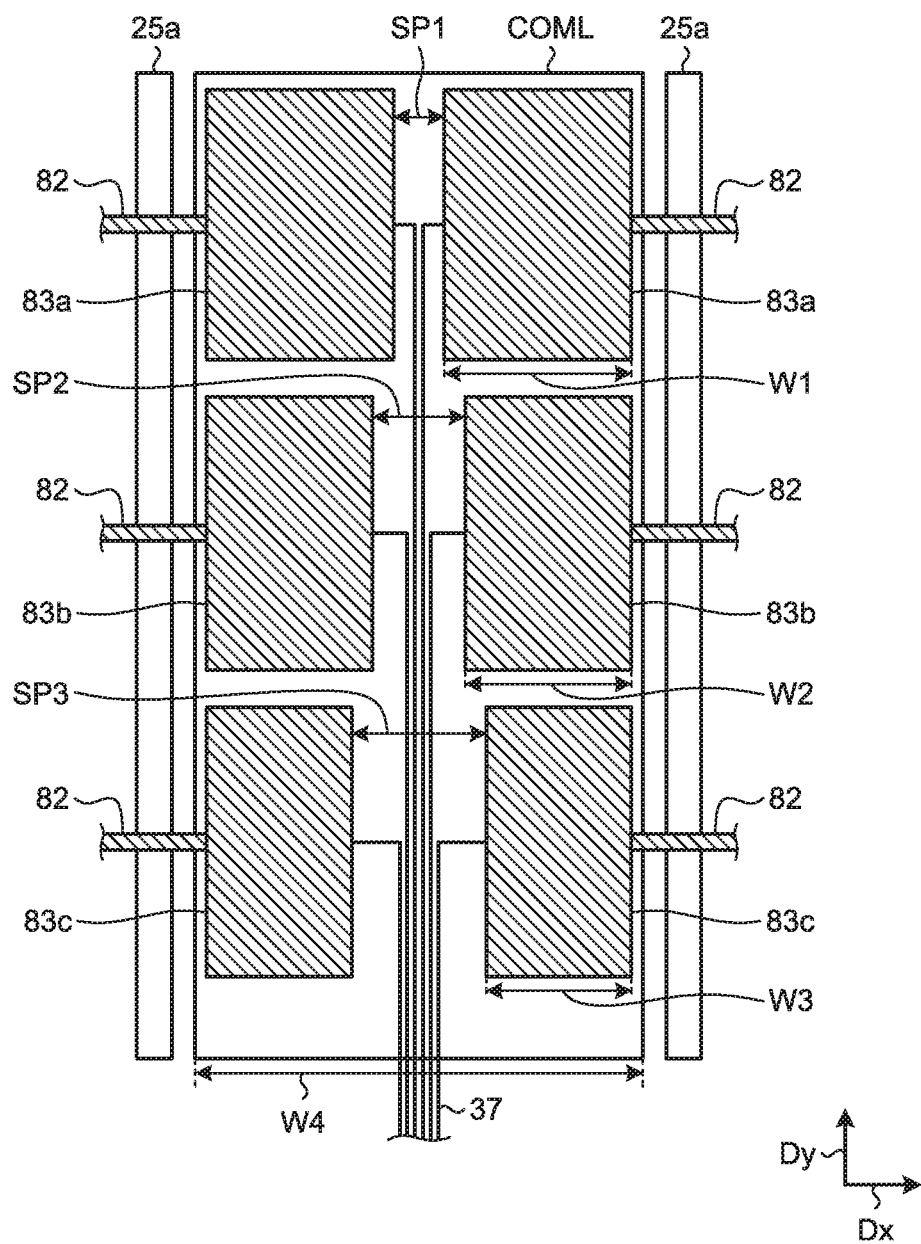
FIG. 31 is a plan view illustrating a coupling portion between the second electrodes and coupling wires in an enlarged manner.

The following describes a coupling configuration of the second electrodes TDL and the coupling wires 37. FIG. 31 is a plan view illustrating a coupling portion between the second electrodes and the coupling wires in an enlarged manner. FIG. 31 illustrates the third portions 83 disposed overlapping one third electrode COML in an enlarged manner. As illustrated in FIG. 31, a plurality of third portions 83a, 83b, and 83c are arrayed in the second direction Dy. Two third portions 83a are disposed facing each other in the first direction Dx and overlapping one third electrode COML. Two third portions 83b face each other in the first direction Dx, and two third portions 83c face each other in the first direction Dx.

The third portions 83a, 83b, and 83c facing each other in the first direction Dx are coupled to the respective coupling wires 37. The coupling wires 37 are coupled to the flexible substrate 72 (refer to FIG. 15) provided in the peripheral region 10b. As illustrated in FIG. 31, the coupling wires 37 are provided in a space SP1 between the third portions 83a facing each other in the first direction Dx, a space SP2 between the third portions 83b, and a space SP3 between the third portions 83c and extend in the second direction Dy. Specifically, the coupling wires 37 are provided overlapping the third electrode COML at the center of the third electrode COML in the first direction Dx. In other words, the coupling wires 37 are disposed at the center between the first electrode 25a provided to one side of the third electrode COML and the first electrode 25a provided to the other side thereof and extend in a direction parallel to the first electrodes 25a.

As illustrated in FIG. 31, the coupling wires 37 are coupled to the respective third portions 83a, 83b, and 83c arrayed in the second direction Dy and extend in the same direction. The coupling wires 37 extend toward the peripheral region 10b provided with the flexible substrate 72. The number of coupling wires 37 provided in the spaces SP1, SP2, and SP3 increases by two. Consequently, the area of the spaces SP1, SP2, and SP3 increases closer to the peripheral region 10b provided with the flexible substrate 72. In other words, the width of the third portions gradually decreases in order of a width W1 of the third portion 83a, a width W2 of the third portion 83b, and a width W3 of the third portion 83c. The structure is not limited thereto, and the widths W1, W2, and W3 may be equal to one another.

The total length of the width W1 of the two third portions 83a and the space SP1 is shorter than a width W4 of the third electrode COML. The total length of the width W2 of the two third portions 83b and the space SP2 is shorter than the width W4 of the third electrode COML. The total length of the width W3 of the two third portions 83c and the space SP3 is shorter than the width W4 of the third electrode COML. With this structure, the third portions 83a, 83b, and 83c and the coupling wires 37 coupled thereto are provided overlapping the third electrode COML.

With this structure, the distance between the first electrodes 25a and the coupling wires 37 increases. Consequently, the display device 1 can suppress capacitive coupling between the first electrodes 25a and the coupling wires 37, thereby increasing the detection accuracy.

As illustrated in FIG. 24 and other figures, the drive circuit 14 sequentially supplies the first drive signals Vcom1 to the drive electrode block BK selected as a detection target via the coupling wires 37 in touch detection. By contrast, the drive circuit 14 supplies DC voltage signals having a fixed electric potential to the drive electrode blocks BK not selected as a detection target via the coupling wires 37.

In FIG. 31, if the second electrodes TDL including the respective third portions 83a are selected as the drive electrode block BK serving as a detection target, for example, the drive circuit 14 supplies the first drive signals Vcom1 to the coupling wires 37 coupled to the respective third portions 83a. By contrast, the drive circuit 14 supplies DC voltage signals to the coupling wires 37 coupled to the respective third portions 83b and 83c. The coupling wires 37 supplied with the first drive signals Vcom1 and the coupling wires 37 supplied with the DC voltage signals are sequentially changed.

As described above, the DC voltage signals are supplied to two or more coupling wires 37 out of the coupling wires 37 disposed overlapping one third electrode COML. As a result, the coupling wires 37 supplied with the DC voltage signals serve as guard wires in touch detection. Consequently, the display device 1 can suppress capacitive coupling between the first electrodes 25a and the coupling wires 37, thereby increasing the detection accuracy.

Figure 32:
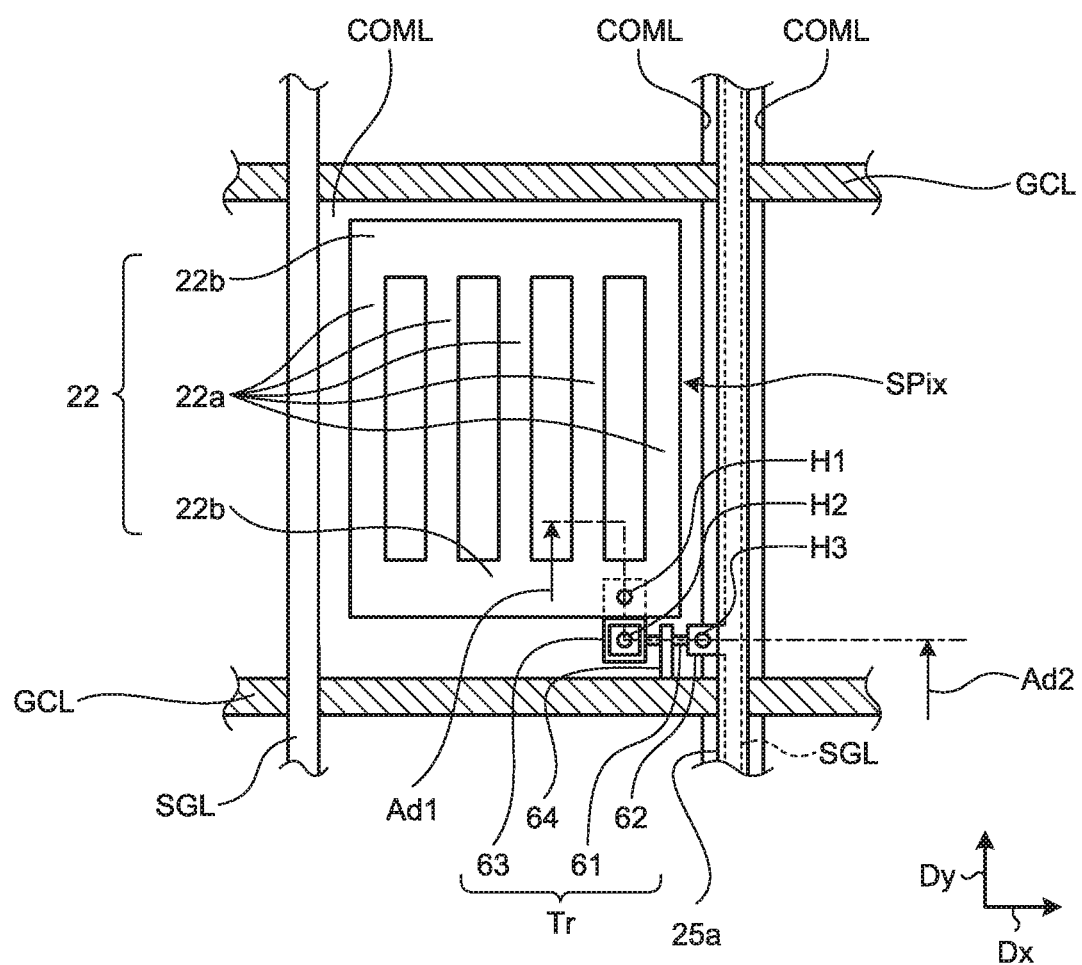
FIG. 32 is a plan view of a sub-pixel according to the present embodiment.
Figure 33:
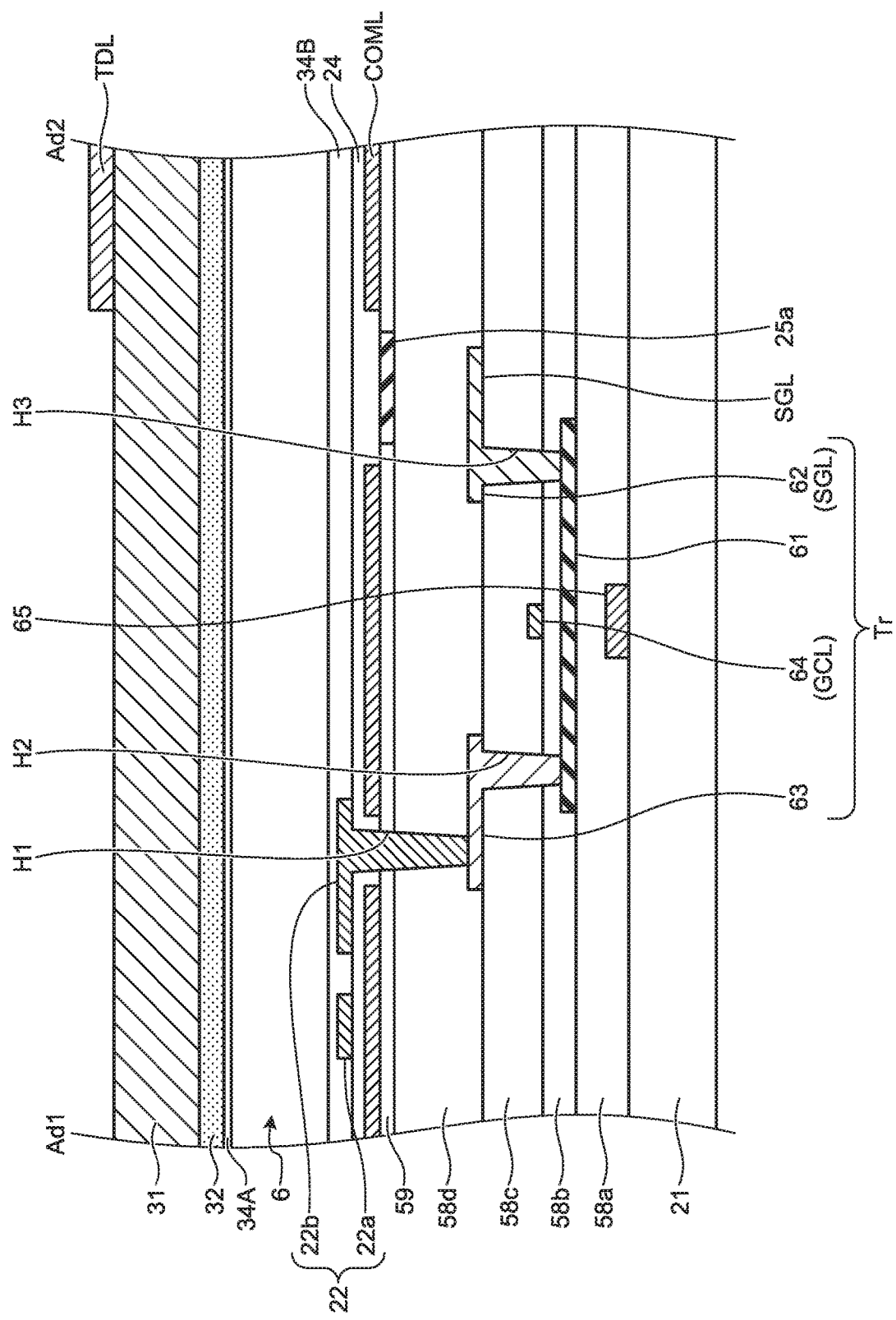
FIG. 33 is a sectional view along line Ad1-Ad2 in FIG. 32.

The following describes a multilayered configuration of the first electrodes 25a and the third electrodes COML. FIG. 32 is a plan view of a sub-pixel according to the present embodiment. FIG. 33 is a sectional view along line Ad1-Ad2 in FIG. 32. As illustrated in FIG. 32, the gate lines GCL extend in the first direction Dx and are arrayed in the second direction Dy. The signal lines SGL intersect the gate lines GCL, extend in the second direction Dy, and are arrayed in the first direction Dx. The switching element Tr is disposed at the intersection of the gate line GCL and the signal line SGL. The section surrounded by the gate lines GCL and the signal lines SGL corresponds to one sub-pixel SPix. The sub-pixel SPix includes a region in which the pixel electrode 22 overlaps the third electrode COML. The first electrode 25a extends in the second direction Dy overlapping the signal line SGL in planar view.

As illustrated in FIG. 32, the pixel electrode 22 includes a plurality of strip electrodes 22a and connection portions 22b. The strip electrodes 22a extend in a direction parallel to the signal lines SGL and are arrayed in a direction along the gate lines GCL. The connection portions 22b each connect the ends of the strip electrodes 22a. While the pixel electrode 22 includes five strip electrodes 22a, the configuration is not limited thereto. The pixel electrode 22 may include four or less or six or more strip electrodes 22a. The pixel electrode 22 may include two strip electrodes 22a, for example.

As illustrated in FIGS. 32 and 33, the switching element Tr includes a semiconductor layer 61, a source electrode 62, a drain electrode 63, and a gate electrode 64. A light-shielding layer 65 is provided under the semiconductor layer 61.

As illustrated in FIG. 33, the light-shielding layer 65 is provided on the first substrate 21. An insulating layer 58a is provided covering the light-shielding layer 65 on the first substrate 21. The semiconductor layer 61 is provided on the insulating layer 58a. The gate electrode 64 (gate line GCL) is provided on the semiconductor layer 61 with an insulating layer 58b interposed therebetween. The drain electrode 63 and the source electrode 62 (signal line SGL) are provided above the gate electrode 64 (gate line GCL) with an insulating layer 58c interposed therebetween. The first electrode 25a is provided above the drain electrode 63 and the source electrode 62 (signal line SGL) with an insulating layer 58d interposed therebetween. The third electrode COML is provided above the first electrode 25a with the insulating layer 59 interposed therebetween. As described above, the pixel electrode 22 is provided on the third electrode COML with the insulating layer 24 interposed therebetween. An orientation film 34B is provided on the pixel electrode 22. An orientation film 34A provided to the second substrate 31 faces the orientation film 34B with the liquid crystal layer 6 interposed therebetween. In other words, the first electrode 25a is provided to a layer between the signal line SGL and the third electrode COML in the direction perpendicular to the surface of the first substrate 21.

As illustrated in FIG. 33, the pixel electrode 22 is coupled to the drain electrode 63 of the switching element Tr through a contact hole H1. The semiconductor layer 61 is coupled to the drain electrode 63 through a contact hole H2. The semiconductor layer 61 intersects the gate electrode 64 in planar view. The gate electrode 64 is coupled to the gate line GCL and protrudes from one side of the gate line GCL. In other words, part of the gate line GCL functions as the gate electrode 64.

The semiconductor layer 61 extends to a position under the source electrode 62 and is electrically coupled to the source electrode 62 through a contact hole H3. The source electrode 62 is coupled to the signal line SGL and protrudes from one side of the signal line SGL. In other words, part of the signal line SGL functions as the source electrode 62.

The semiconductor layer 61 may be made of a publicly known material, such as polysilicon and an oxide semiconductor. The light-shielding layer 65 provided under the semiconductor layer 61 blocks light output from the backlight and entering into the semiconductor layer 61, for example.

With the multilayered structure described above, the first electrodes 25a are provided not under the third electrodes COML in a layer different from that of the third electrodes COML. The first electrodes 25a are provided overlapping the signal lines SGL in a layer different from that of the signal lines SGL and the gate lines GCL. As described above, the second electrodes TDL are provided not overlapping the first electrodes 25a. A plurality of first electrodes 25a may be provided at each position not under the second electrodes TDL to serve as one detection electrode in touch detection. The third electrodes COML provided not under the second electrodes TDL may serve as detection electrodes in touch detection. The first electrodes 25a are not electrically coupled to the third electrodes COML provided under the second electrodes TDL nor the switching elements Tr. Wires including a metal material, which are not illustrated, may be provided to the same layer as that of the first electrodes 25a corresponding to the signal lines SGL not provided with the first electrodes 25a out of the signal lines SGL.

As described above, the second electrodes TDL are provided closer to the display surface DS than the first electrodes 25a in the display device 1 according to the present embodiment. The second electrodes TDL serve not only as drive electrodes in touch detection but also as detection electrodes in hover detection. The area of the second electrodes TDL or the detection electrode blocks BKD is larger than that of the first electrodes 25a. With this configuration, the display device 1 can increase the detection sensitivity in hover detection. The second electrodes TDL are provided not overlapping the first electrodes 25a. With this configuration, the display device 1 can perform touch detection satisfactorily. Consequently, the display device 1 can perform accurate touch detection and satisfactory hover detection using the second electrodes TDL both in touch detection and hover detection.

First Modification

Figure 34:
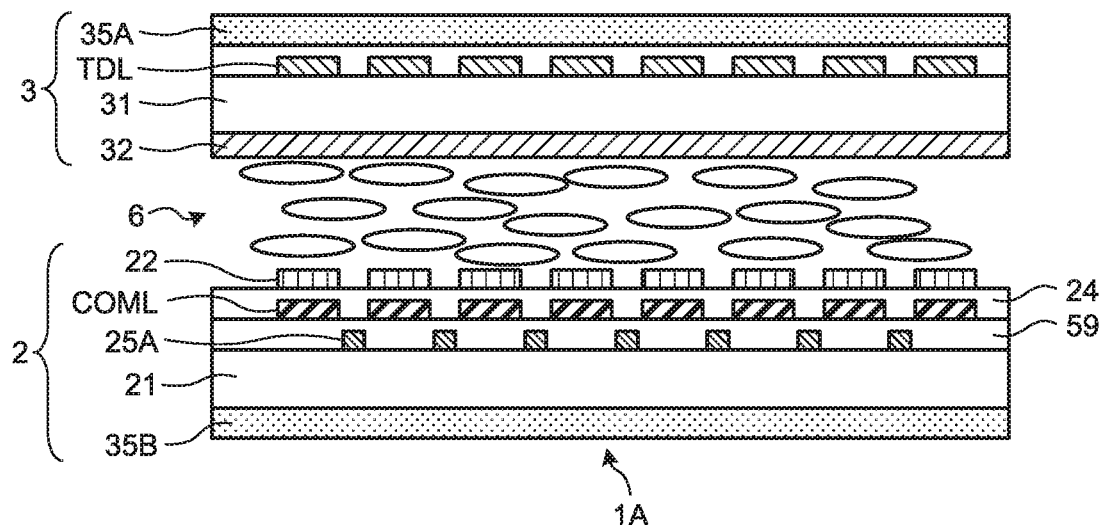
FIG. 34 is a sectional view of a schematic sectional structure of the display device according to a first modification of the present embodiment.
Figure 35:
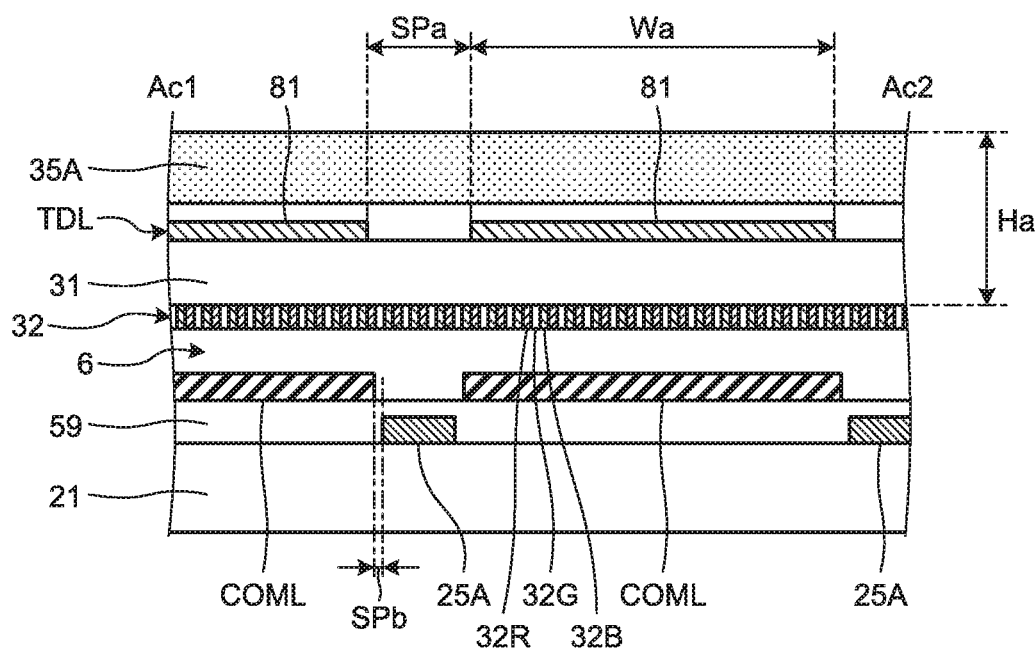
FIG. 35 is a sectional view illustrating the display device according to the first modification of the present embodiment in a partially enlarged manner.

FIG. 34 is a sectional view of a schematic sectional structure of the display device according to a first modification of the present embodiment. FIG. 35 is a sectional view illustrating the display device according to the first modification of the present embodiment in a partially enlarged manner. FIG. 35 is a sectional view of a portion corresponding to line Ac1-Ac2 in FIG. 26.

In a display device 1A according to the present modification, first electrodes 25A are provided to a layer different from that of the third electrodes COML with the insulating layer 59 interposed therebetween. The first electrodes 25A are arrayed below the third electrodes COML with a space interposed therebetween. The first electrodes 25A according to the present modification may be made of a metal material including at least one of Al, Cu, Ag, Mo, and an alloy of these metals.

The relation between the first electrodes 25A and the third electrodes COML in planar view is the same as that between the first electrodes 25a and the third electrodes COML illustrated in FIG. 13. As illustrated in FIG. 35, the first electrode 25A has a width slightly smaller than the space SPa between the first portions 81 disposed side by side. The space SPb between the first electrode 25A and the third electrode COML is approximately 3 μm, for example. The color areas 32R, 32G, and 32B of the color filter 32 are repeatedly arrayed at the position under the first portion 81 and the position under the space SPa. As described above, a set of the color areas 32R, 32G, and 32B corresponds to one pixel Pix. In other words, the first electrode 25A is provided across a plurality of pixels Pix. With this configuration, the lines of electric force Ef (refer to FIG. 25) of the fringe electric field pass through the space SPa and reach the first electrode 25A in touch detection. Consequently, the display device 1A can perform touch detection satisfactorily.

Second Modification

Figure 36:
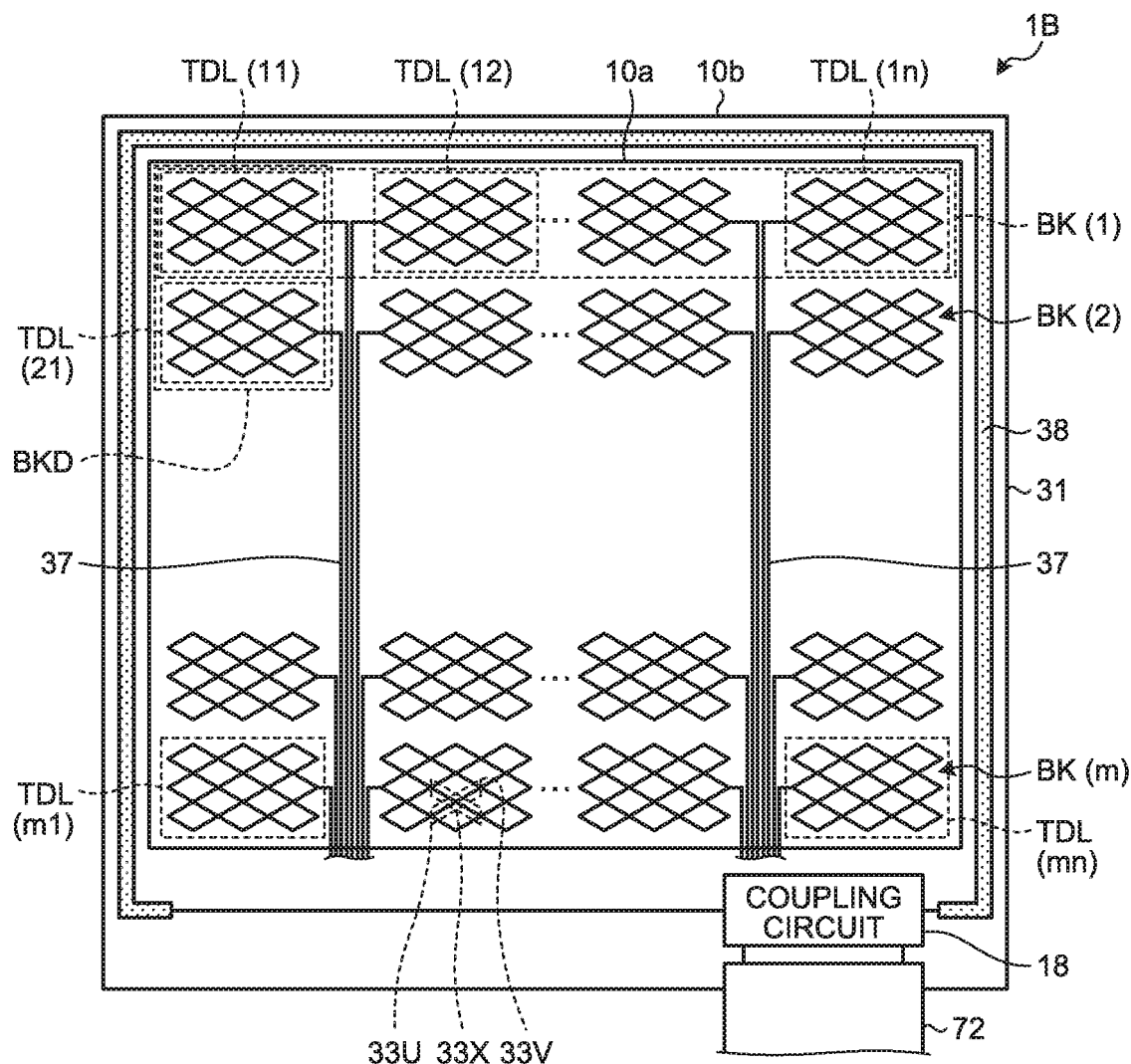
FIG. 36 is a plan view of the second substrate according to a second modification of the present embodiment.
Figure 37:
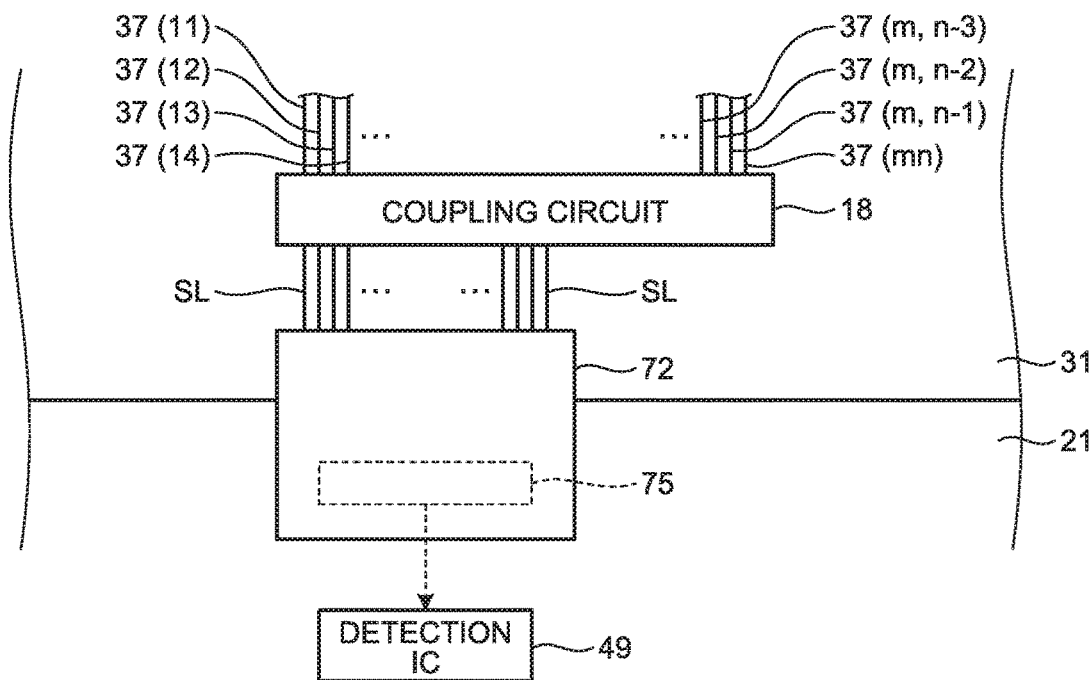
FIG. 37 is a diagram for explaining a coupling configuration between the first substrate and the second substrate.

FIG. 36 is a plan view of the second substrate according to a second modification of the present embodiment. FIG. 37 is a diagram for explaining a coupling configuration between the first substrate and the second substrate. As illustrated in FIG. 37, a display device 1B according to the present modification includes the coupling circuit 18 in the peripheral region 10b of the second substrate 31. The configuration of the first electrodes 25a (not illustrated) and the second electrodes TDL is the same as that in the examples described above.

The coupling wires 37 are coupled to the respective second electrodes TDL arrayed in a matrix (row-column configuration). The coupling wires 37 extend to the peripheral region 10b coupled to the flexible substrate 72 and are coupled to the coupling circuit 18. As illustrated in FIG. 37, the coupling circuit 18 is coupled to coupling wires 37(11), 37(12), 37(13), 37(14), . . . , and 37(mn). The coupling wire 37(11) is coupled to the second electrode TDL(11), the coupling wire 37(12) is coupled to the second electrode TDL(12), and the coupling wire 37(mn) is coupled to a second electrode TDL(mn). In other words, the number of coupling wires 37 is equal to the number of second electrodes TDL.

The coupling circuit 18 electrically couples a plurality of second electrodes TDL in touch detection and hover detection. The drive circuit 14 supplies the first drive signals Vcom1 or the second drive signals Vcom2 via the wires SL, thereby collectively driving the drive electrode blocks BK or the detection electrode blocks BKD. Specifically, the number of wires SL that couple the coupling circuit 18 and the flexible substrate 72 is equal to the number of drive electrode blocks BK or detection electrode blocks BKD. In other words, the number of wires SL is smaller than the number of coupling wires 37.

The wires SL are coupled to the flexible substrate 72 and electrically coupled to the first substrate 21 via the coupling terminal 75. As a result, the coupling circuit 18 is electrically coupled to the detection IC 49. The coupling circuit 18 according to the present modification is provided to the second substrate 31. This configuration requires a smaller number of wires that couple the second substrate 31 and the first substrate 21. In other words, the present modification can simplify the configuration of the flexible substrate 72 and the coupling terminal 75 and the configuration of various kinds of wires provided to the peripheral region 10b of the first substrate 21, thereby reducing the manufacturing cost. The coupling circuit 18 is not provided to the first substrate 21. Consequently, the display device 1B has a higher flexibility in designing various kinds of wires, circuits, and other components provided to the first substrate 21.

Third Modification

Figure 38:
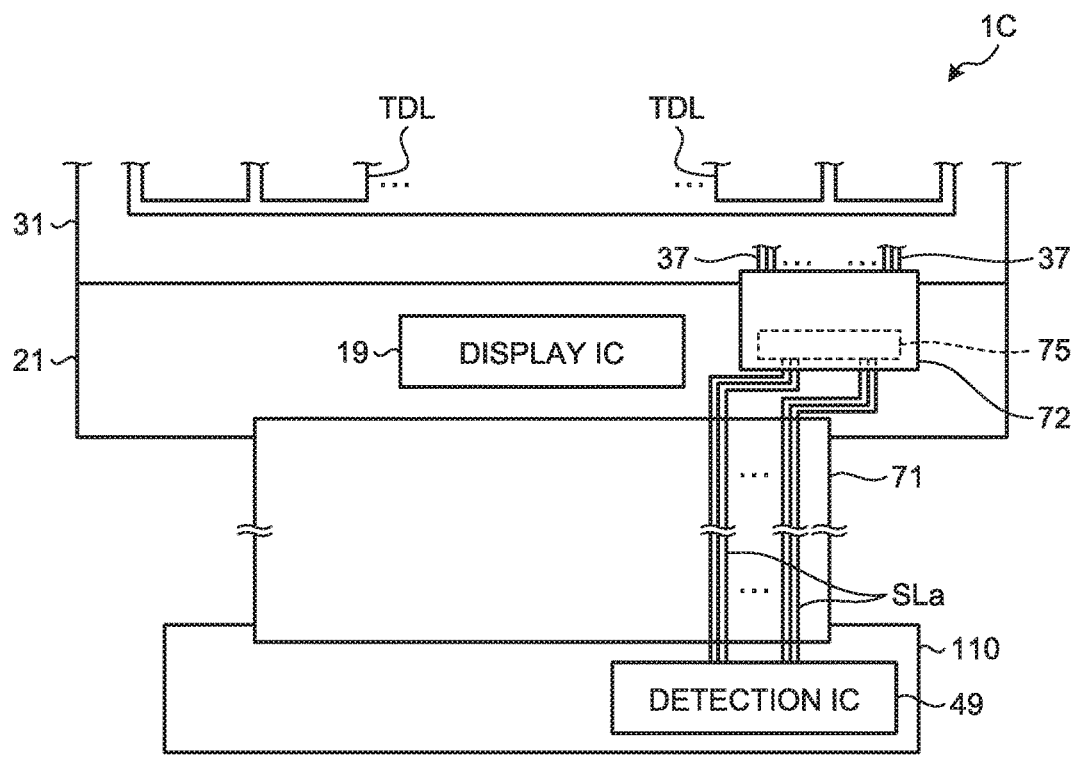
FIG. 38 is a diagram for explaining a coupling configuration between the first substrate and the second substrate according to a third modification of the present embodiment.

FIG. 38 is a diagram for explaining a coupling configuration between the first substrate and the second substrate according to a third modification of the present embodiment. While the coupling circuit 18 in the examples above is provided to the first substrate 21 or the second substrate 31, the configuration is not limited thereto. As illustrated in FIG. 38, in a display device 1C according to the present modification, the first substrate 21 is coupled to a control substrate 110 via the flexible substrate 71. The detection IC 49 is mounted on the control substrate 110. In the present modification, the detection IC 49 functions as the coupling circuit 18.

As illustrated in FIG. 38, the second electrodes TDL provided to the second substrate 31 are coupled to the flexible substrate 72 via the coupling wires 37. The flexible substrate 72 is coupled to the first substrate 21 via the coupling terminal 75 and electrically coupled to the detection IC 49 via wires SLa of the flexible substrate 71. In this case, the number of wires SLa is equal to the number of coupling wires 37. The detection IC 49 according to the present modification changes the coupling state of the second electrodes TDL between touch detection and hover detection to perform touch detection and hover detection.

The coupling circuit 18 according to the present modification is not provided in the peripheral region 10b of the first substrate 21 or the second substrate 31. This configuration can make the peripheral region 10b of the first substrate 21 or the second substrate 31 narrower. The first switches SW11 to SW14, the second switches SW21 to SW28, and various kinds of wires included in the coupling circuit 18 are provided to the control substrate 110. Consequently, the display device 1C can suppress noise generated from the coupling circuit 18, thereby providing satisfactory detection sensitivity in touch detection and hover detection.

Fourth Modification

Figure 39:
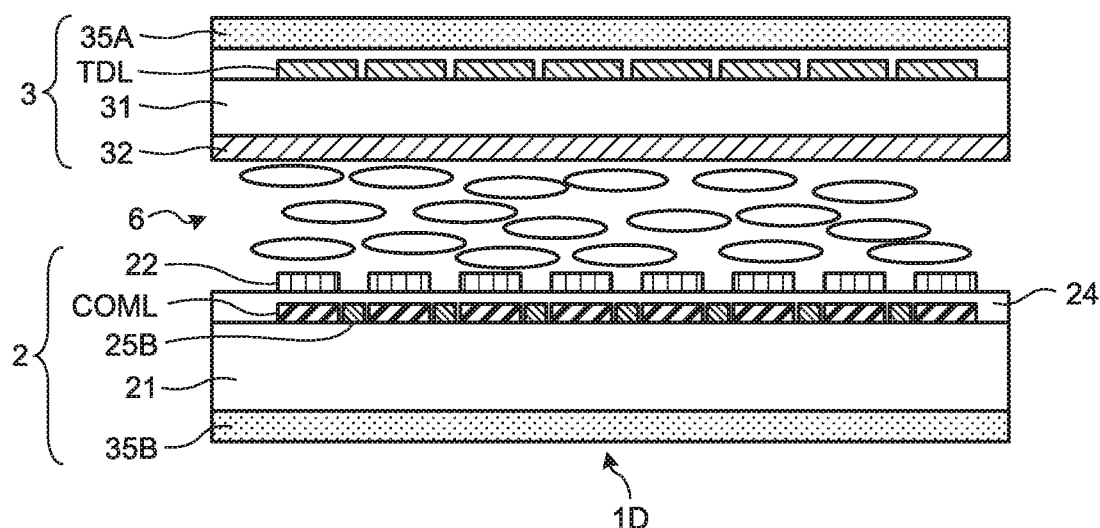
FIG. 39 is a sectional view of a schematic sectional structure of the display device according to a fourth modification of the present embodiment.
Figure 40:
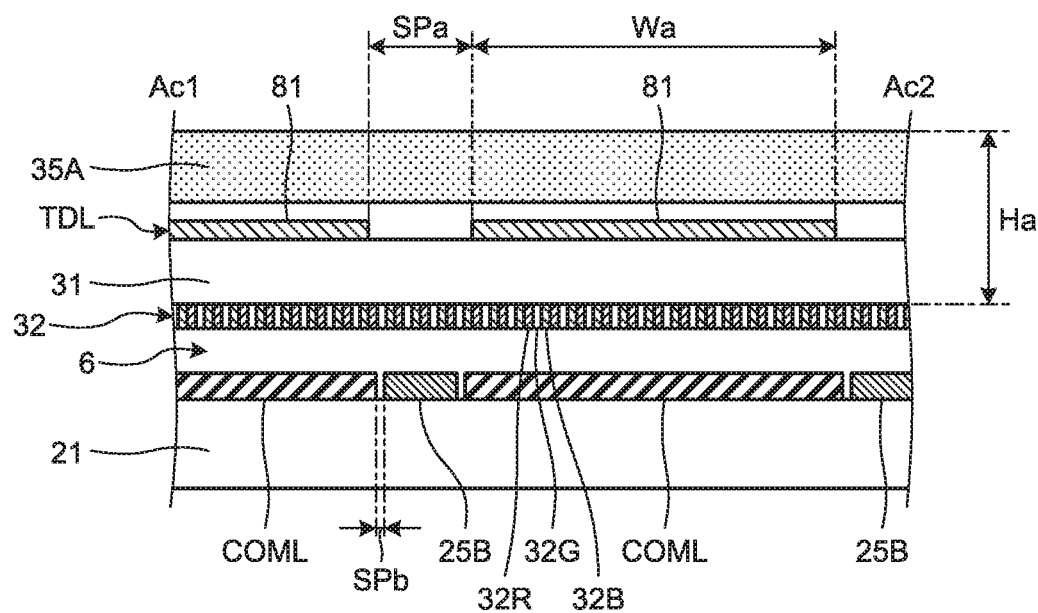
FIG. 40 is a sectional view illustrating the display device according to the fourth modification of the present embodiment in a partially enlarged manner.

FIG. 39 is a sectional view of a schematic sectional structure of the display device according to a fourth modification of the present embodiment. FIG. 40 is a sectional view illustrating the display device according to the fourth modification of the present embodiment in a partially enlarged manner. FIG. 40 is a sectional view of a portion corresponding to line Ac1-Ac2 in FIG. 26. In a display device 1D according to the present modification, first electrodes 25B are provided to the same layer as that of the third electrodes COML. The first electrodes 25B are arrayed side by side with the third electrodes COML with a space interposed therebetween. The relation between the first electrodes 25B and the third electrodes COML in planar view is the same as that in the example illustrated in FIG. 13.

The first electrodes 25B according to the present modification are made of the same material as that of the third electrodes COML, that is, translucent conductive oxide, such as ITO. With this structure, the first electrodes 25B can be produced in the same process as that of the third electrodes COML. Furthermore, the distance between the first electrodes 25B and the signal lines SGL is made larger than that in the configuration illustrated in FIG. 33. This configuration can reduce capacitance between the first electrodes 25B and the signal lines SGL.

The use of ITO for the first electrodes 25B may possibly reduce the response speed in touch detection because the resistance of ITO is higher than that of the metal materials described above. In this case, the first electrodes 25B may be producing by placing a metal layer on ITO. Alternatively, as illustrated in FIGS. 32 and 33, metal wires may be provided under the signal lines SGL. Electrical coupling of the metal wires to the first electrodes 25B can reduce the resistance.

The relation between the first electrodes 25B and the third electrodes COML in planar view is the same as that between the first electrodes 25a and the third electrodes COML illustrated in FIG. 13. As illustrated in FIG. 40, the first electrode 25B has a width slightly smaller than the space SPa between the first portions 81 disposed side by side. The space SPb between the first electrode 25B and the third electrode COML is approximately 3 μm, for example. The color areas 32R, 32G, and 32B of the color filter 32 are repeatedly arrayed at the position under the first portion 81 and the position under the space SPa. As described above, a set of the color areas 32R, 32G, and 32B corresponds to one pixel Pix. In other words, the first electrode 25B is provided across a plurality of pixels Pix. With this configuration, the lines of electric force Ef (refer to FIG. 25) of the fringe electric field pass through the space SPa and reach the first electrode 25B in touch detection. Consequently, the display device 1D can perform touch detection satisfactorily.

While exemplary embodiments according to the present disclosure have been described, the embodiments are not intended to limit the disclosure. The contents disclosed in the embodiments are given by way of example only, and various changes may be made without departing from the spirit of the present disclosure. Appropriate changes made without departing from the spirit of the present disclosure naturally fall within the technical scope of the disclosure.

The shapes, the positions, and the numbers of the first electrodes 25, 25A, and 25B, the second electrodes TDL, the third electrodes COML, the pixel electrodes 22, and other components are given by way of example only and may be appropriately modified. While mutual capacitance touch detection has been described, the present disclosure is also applicable to a configuration that performs self-capacitance touch detection using the first electrodes 25, 25A, and 25B or the second electrodes TDL.

The display device according to the present aspect may have the following aspects, for example.

(1) A display device comprising:
 a first substrate;
 a second substrate facing the first substrate;
 a first electrode provided in a display region of the first substrate;
 a second electrode provided to the second substrate at a position closer to a display surface than the first electrode in a direction perpendicular to the first substrate;
 a drive circuit configured to supply a first drive signal or a second drive signal to the second electrode; and
 a control circuit having a first detection mode for detecting an object to be detected in contact with the display surface based on a first detection signal corresponding to a change in mutual capacitance between the first electrode and the second electrode when the first drive signal is supplied to the second electrode, and a second detection mode for detecting the object to be detected not in contact with the display surface based on a second detection signal corresponding to a change in self-capacitance in the second electrode when the second drive signal is supplied to the second electrode, wherein
 the first electrode and the second electrode do not overlap in planar view.

(2) The display device according to (1), including:
 a plurality of the first electrodes and a plurality of the second electrodes, wherein
 the first electrodes are arrayed in a first direction in planar view and each extend in a second direction intersecting the first direction, and
 the second electrodes are arrayed in the first direction and the second direction.

(3) The display device according to (2), further comprising:
 a plurality of coupling wires coupled to the respective second electrodes; and
 a coupling circuit coupled to the second electrodes via the coupling wires, wherein
 the coupling circuit is configured to switch a coupling state of the second electrodes between the first detection mode and the second detection mode.

(4) The display device according to (3), wherein
 the coupling circuit electrically couples the second electrodes arrayed in the first direction to form a drive electrode block in the first detection mode, and
 the drive circuit supplies the first drive signal to the drive electrode block.

(5) The display device according to (3), wherein
 the coupling circuit electrically couples the second electrodes arrayed in the second direction to form a detection electrode block in the second detection mode, and
 the drive circuit supplies the second drive signal to the detection electrode block.

(6) The display device according to (4), further comprising:
 a plurality of third electrodes disposed on the first substrate with a space interposed between the first electrodes and the third electrodes in planar view, wherein
 the drive circuit supplies a display drive signal serving as a common potential for a plurality of pixels to the first electrodes and the third electrodes in a display mode for displaying an image on the display surface.

(7) The display device according to (6), wherein the first electrodes are provided to a layer different from a layer of the third electrodes.

(8) The display device according to (6), wherein the first electrodes are provided to the same layer as a layer of the third electrodes.

(9) The display device according to (6), wherein the second electrode includes a plurality of rectangular first portions arrayed in the first direction and a second portion coupling the first portions disposed side by side in the first direction, the second portion is disposed intersecting the first electrode in planar view, the length of the second portion in the second direction is shorter than the length of the first portion in the second direction, and the first portion and the second portion include a plurality of mesh-shaped, zigzag-line-shaped, or wavy-line-shaped metal wires.

(10) The display device according to (6), wherein the coupling wires are provided between the second electrodes facing in the first direction and extend in the second direction overlapping the third electrodes in planar view.

(11) The display device according to (9), wherein the first portions are disposed overlapping the respective third electrodes arrayed in the first direction in planar view.

(12) The display device according to (9) wherein the second electrode further includes a third portion disposed at an end in the first direction, and the length of the third portion in the first direction is shorter than the length of the first portion in the first direction.

(13) The display device according to (12), wherein two of the third portions facing in the first direction are disposed overlapping the third electrode in planar view.

(14) The display device according to (6), wherein the drive circuit supplies a guard signal synchronized with the second drive signal and having the same electric potential as an electric potential of the second drive signal to at least one of the first electrodes or the third electrodes in the second detection mode.

(15) The display device according to (3), wherein the coupling circuit is provided in a peripheral region on the outside of the display region of the first substrate.

(16) The display device according to (3), wherein the coupling circuit is provided in a peripheral region on the outside of the display region of the second substrate.

(17) The display device according to (6), wherein a signal line configured to supply a pixel signal to the pixels is provided to the first substrate, and the first electrode is disposed overlapping the signal line in planar view and extends in a direction parallel to the signal line.

What is claimed is:

1. A display device comprising:
a first substrate;
a second substrate facing the first substrate;
a first electrode provided in a display region of the first substrate;
a second electrode provided to the second substrate at a position closer to a display surface than the first electrode in a direction perpendicular to the first substrate;
a drive circuit configured to supply a first drive signal or a second drive signal to the second electrode;
a plurality of the first electrodes and a plurality of the second electrodes;
a plurality of coupling wires coupled to the respective second electrodes;
a coupling circuit coupled to the second electrodes via the coupling wires,
a plurality of third electrodes disposed on the first substrate with a space interposed between the first electrodes and the third electrodes in planar view and
a control circuit having a first detection mode for detecting an object to be detected in contact with the display surface based on a first detection signal corresponding to a change in mutual capacitance between the first electrode and the second electrode when the first drive signal is supplied to the second electrode, and a second detection mode for detecting the object to be detected not in contact with the display surface based on a second detection signal corresponding to a change in self-capacitance in the second electrode when the second drive signal is supplied to the second electrode, wherein the first electrode and the second electrode do not overlap in planar view the first electrodes are arrayed in a first direction in planar view and each extend in a second direction intersecting the first direction, the second electrodes are arrayed in the first direction and the second direction, the coupling circuit is configured to switch a coupling state of the second electrodes between the first detection mode and the second detection mode, the coupling circuit electrically couples the second electrodes arrayed in the first direction to form a drive electrode block in the first detection mode, the drive circuit supplies the first drive signal to the drive electrode block, the coupling circuit electrically couples the second electrodes arrayed in the second direction to form a detection electrode block in the second detection mode and the drive circuit supplies the second drive signal to the detection electrode block, the drive circuit supplies a display drive signal serving as a common potential for a plurality of pixels to the first electrodes and the third electrodes in a display mode for displaying an image on the display surface, and the first electrodes are provided to the same layer as a layer of the third electrodes.

2. The display device according to claim 1, wherein
the second electrode includes a plurality of rectangular first portions arrayed in the first direction and a second portion coupling the first portions disposed side by side in the first direction, the second portion is disposed intersecting the first electrode in planar view, the length of the second portion in the second direction is shorter than the length of the first portion in the second direction, and the first portion and the second portion include a plurality of mesh-shaped, zigzag-line-shaped, or wavy-line-shaped metal wires.

3. The display device according to claim 1, wherein the coupling wires are provided between the second electrodes facing in the first direction and extend in the second direction overlapping the third electrodes in planar view.

4. The display device according to claim 2, wherein the first portions are disposed overlapping the respective third electrodes arrayed in the first direction in planar view.

5. The display device according to claim 2, wherein
the second electrode further includes a third portion disposed at an end in the first direction, and
the length of the third portion in the first direction is shorter than the length of the first portion in the first direction.

6. The display device according to claim 5, wherein two of the third portions facing in the first direction are disposed overlapping the third electrode in planar view.

7. The display device according to claim 1, wherein the coupling circuit is provided in a peripheral region on the outside of the display region of the first substrate.

8. The display device according to claim 1, wherein the coupling circuit is provided in a peripheral region on the outside of the display region of the second substrate.

9. A display device comprising:
a first substrate;
a second substrate facing the first substrate;
a first electrode provided in a display region of the first substrate;
a second electrode provided to the second substrate at a position closer to a display surface than the first electrode in a direction perpendicular to the first substrate;
a drive circuit configured to supply a first drive signal or a second drive signal to the second electrode;
a plurality of the first electrodes and a plurality of the second electrodes;
a plurality of coupling wires coupled to the respective second electrodes;
a coupling circuit coupled to the second electrodes via the coupling wires,
a plurality of third electrodes disposed on the first substrate with a space interposed between the first electrodes and the third electrodes in planar view, and
a control circuit having a first detection mode for detecting an object to be detected in contact with the display surface based on a first detection signal corresponding to a change in mutual capacitance between the first electrode and the second electrode when the first drive signal is supplied to the second electrode, and a second detection mode for detecting the object to be detected not in contact with the display surface based on a second detection signal corresponding to a change in self-capacitance in the second electrode when the second drive signal is supplied to the second electrode,
wherein
the first electrode and the second electrode do not overlap in planar view,
the first electrodes are arrayed in a first direction in planar view and each extend in a second direction intersecting the first direction,
the second electrodes are arrayed in the first direction and the second direction,
the coupling circuit is configured to switch a coupling state of the second electrodes between the first detection mode and the second detection mode,
the coupling circuit electrically couples the second electrodes arrayed in the first direction to form a drive electrode block in the first detection mode,
the drive circuit supplies the first drive signal to the drive electrode block,
the coupling circuit electrically couples the second electrodes arrayed in the second direction to form a detection electrode block in the second detection mode
the drive circuit supplies the second drive signal to the detection electrode block,
the drive circuit supplies a display drive signal serving as a common potential for a plurality of pixels to the first electrodes and the third electrodes in a display mode for displaying an image on the display surface, and
the drive circuit supplies a guard signal synchronized with the second drive signal and having the same electric potential as an electric potential of the second drive signal to at least one of the first electrodes or the third electrodes in the second detection mode.

10. The display device according to claim 9, wherein
the second electrode includes a plurality of rectangular first portions arrayed in the first direction and a second portion coupling the first portions disposed side by side in the first direction,
the second portion is disposed intersecting the first electrode in planar view,
the length of the second portion in the second direction is shorter than the length of the first portion in the second direction, and
the first portion and the second portion include a plurality of mesh-shaped, zigzag-line-shaped, or wavy-line-shaped metal wires.

11. The display device according to claim 9, wherein the coupling wires are provided between the second electrodes facing in the first direction and extend in the second direction overlapping the third electrodes in planar view.

12. The display device according to claim 10, wherein the first portions are disposed overlapping the respective third electrodes arrayed in the first direction in planar view.

13. The display device according to claim 10,
wherein
the second electrode further includes a third portion disposed at an end in the first direction, and
the length of the third portion in the first direction is shorter than the length of the first portion in the first direction.

14. The display device according to claim 13, wherein two of the third portions facing in the first direction are disposed overlapping the third electrode in planar view.

15. A display device comprising:
a first substrate;
a second substrate facing the first substrate;
a first electrode provided in a display region of the first substrate;
a second electrode provided to the second substrate at a position closer to a display surface than the first electrode in a direction perpendicular to the first substrate;
a drive circuit configured to supply a first drive signal or a second drive signal to the second electrode;
a plurality of the first electrodes and a plurality of the second electrodes;
a plurality of coupling wires coupled to the respective second electrodes;
a coupling circuit coupled to the second electrodes via the coupling wires,
a plurality of third electrodes disposed on the first substrate with a space interposed between the first electrodes and the third electrodes in planar view, and
a control circuit having a first detection mode for detecting an object to be detected in contact with the display surface based on a first detection signal corresponding to a change in mutual capacitance between the first electrode and the second electrode when the first drive signal is supplied to the second electrode, and a second detection mode for detecting the object to be detected not in contact with the display surface based on a second detection signal corresponding to a change in self-capacitance in the second electrode when the second drive signal is supplied to the second electrode,
wherein
the first electrode and the second electrode do not overlap in planar view,
the first electrodes are arrayed in a first direction in planar view and each extend in a second direction intersecting the first direction,
the second electrodes are arrayed in the first direction and the second direction,
the coupling circuit is configured to switch a coupling state of the second electrodes between the first detection mode and the second detection mode
the coupling circuit electrically couples the second electrodes arrayed in the first direction to form a drive electrode block in the first detection mode
the drive circuit supplies the first drive signal to the drive electrode block,
the coupling circuit electrically couples the second electrodes arrayed in the second direction to form a detection electrode block in the second detection mode and
the drive circuit supplies the second drive signal to the detection electrode
the drive circuit supplies a display drive signal serving as a common potential for a plurality of pixels to the first electrodes and the third electrodes in a display mode for displaying an image on the display surface,
a signal line configured to supply a pixel signal to the pixels is provided to the first substrate, and
the first electrode is disposed overlapping the signal line in planar view and extends in a direction parallel to the signal line.

16. The display device according to claim 15,
the second electrode includes a plurality of rectangular first portions arrayed in the first direction and a second portion coupling the first portions disposed side by side in the first direction,
the second portion is disposed intersecting the first electrode in planar view, the length of the second portion in the second direction is shorter than the length of the first portion in the second direction, and
the first portion and the second portion include a plurality of mesh-shaped, zigzag-line-shaped, or wavy-line-shaped metal wires.

17. The display device according to claim 15, wherein the coupling wires are provided between the second electrodes facing in the first direction and extend in the second direction overlapping the third electrodes in planar view.

18. The display device according to claim 16, wherein the first portions are disposed overlapping the respective third electrodes arrayed in the first direction in planar view.

19. The display device according to claim 16,
wherein
the second electrode further includes a third portion disposed at an end in the first direction, and
the length of the third portion in the first direction is shorter than the length of the first portion in the first direction.

20. The display device according to claim 19, wherein two of the third portions facing in the first direction are disposed overlapping the third electrode in planar view.

* * * * *